(12) United States Patent
Kenmochi et al.

(10) Patent No.: US 9,796,156 B2
(45) Date of Patent: Oct. 24, 2017

(54) GAS BARRIER FILM LAMINATE AND ELECTRONIC COMPONENT

(75) Inventors: Suguru Kenmochi, Tokyo (JP); Satoshi Naganawa, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 448 days.

(21) Appl. No.: 14/234,805

(22) PCT Filed: Jul. 6, 2012

(86) PCT No.: PCT/JP2012/067328
§ 371 (c)(1),
(2), (4) Date: Mar. 6, 2014

(87) PCT Pub. No.: WO2013/015096
PCT Pub. Date: Jan. 31, 2013

(65) Prior Publication Data
US 2014/0170431 A1    Jun. 19, 2014

(30) Foreign Application Priority Data

Jul. 25, 2011 (JP) ................................ 2011-162375
Jul. 25, 2011 (JP) ................................ 2011-162376

(51) Int. Cl.
*B32B 7/12* (2006.01)
*B32B 27/32* (2006.01)
(Continued)

(52) U.S. Cl.
CPC .............. *B32B 7/12* (2013.01); *B32B 27/281* (2013.01); *B32B 27/285* (2013.01);
(Continued)

(58) Field of Classification Search
CPC ... B32B 7/12; B32B 2255/10; B32B 2255/26; B32B 2307/7242; B32B 2307/7244;
(Continued)

(56) References Cited

U.S. PATENT DOCUMENTS

2006/0062995 A1* 3/2006 Yamamoto .............. B32B 27/08
                                                                    428/332
2012/0003448 A1* 1/2012 Weigel .............. B32B 17/10018
                                                                    428/212

FOREIGN PATENT DOCUMENTS

JP          6-286046 A     10/1994
JP       2000-338901 A     12/2000
(Continued)

OTHER PUBLICATIONS

International Search Report issued in PCT/JP2012/067328, dated Sep. 25, 2012

*Primary Examiner* — Ling Choi
*Assistant Examiner* — David L Miller
(74) *Attorney, Agent, or Firm* — Birch, Stewart, Kolasch & Birch, LLP

(57) ABSTRACT

The invention relates to a gas barrier film laminate comprising at least two gas barrier films and a pressure-sensitive adhesive layer, the at least two gas barrier films being stacked through the pressure-sensitive adhesive layer, at least one of the at least two gas barrier films including a base formed of a plastic film, and at least one gas barrier layer provided on the base, and the pressure-sensitive adhesive layer being a layer formed using a rubber-based pressure-sensitive adhesive composition that includes a rubber-based compound. The invention also relates to an electronic member comprising the gas barrier film laminate. The gas barrier film laminate exhibits a high water vapor barrier capability, and does not show interfacial lifting at the end thereof.

17 Claims, 2 Drawing Sheets

(51) Int. Cl.
  *B32B 27/34* (2006.01)
  *B32B 27/36* (2006.01)
  *B32B 27/30* (2006.01)
  *C09J 123/22* (2006.01)
  *B32B 27/28* (2006.01)

(52) U.S. Cl.
  CPC .......... *B32B 27/286* (2013.01); *B32B 27/288* (2013.01); *B32B 27/308* (2013.01); *B32B 27/32* (2013.01); *B32B 27/325* (2013.01); *B32B 27/34* (2013.01); *B32B 27/36* (2013.01); *B32B 27/365* (2013.01); *C09J 123/22* (2013.01); *B32B 27/28* (2013.01); *B32B 2255/10* (2013.01); *B32B 2255/26* (2013.01); *B32B 2307/7242* (2013.01); *B32B 2307/7244* (2013.01); *B32B 2307/7246* (2013.01); *B32B 2307/7248* (2013.01); *B32B 2457/00* (2013.01); *B32B 2457/12* (2013.01); *B32B 2457/20* (2013.01); *Y10T 428/31931* (2015.04)

(58) Field of Classification Search
  CPC .... B32B 2307/7246; B32B 2307/7248; B32B 27/28–327/365; C09J 123/22
  See application file for complete search history.

(56) References Cited

FOREIGN PATENT DOCUMENTS

| | | |
|---|---|---|
| JP | 2006-123307 A | 5/2006 |
| JP | 2006-297737 A | 11/2006 |
| JP | 2007-173449 A | 7/2007 |
| JP | 2011-126962 A | 6/2011 |
| WO | WO 2004/101276 A1 | 11/2004 |

\* cited by examiner (a)

(b)

GAS BARRIER FILM LAMINATE AND ELECTRONIC COMPONENT

TECHNICAL FIELD

The invention relates to a gas barrier film laminate that exhibits an excellent gas barrier capability, and includes at least two gas barrier films that are stacked through a pressure-sensitive adhesive layer, and an electronic member that includes the gas barrier film laminate.

BACKGROUND ART

Use of a transparent plastic film as a substrate for an electronic member (e.g., solar cell, liquid crystal display, or electroluminescence (EL) display) instead of a glass plate (sheet) has been studied in order to implement a reduction in thickness, a reduction in weight, flexibility, impact resistance, and the like. However, since a plastic film easily allows water vapor, oxygen, and the like to pass through as compared with a glass plate, the elements provided in an electronic member may easily deteriorate.

In order to solve the above problem, Patent Document 1 discloses a flexible display substrate in which a transparent gas barrier layer formed of a metal oxide is stacked on a transparent plastic film. Patent Document 2 discloses a gas barrier laminate that includes a plastic film, and a resin layer that contains a polyorganosilsesquioxane as the main component and is stacked on at least one side of the plastic film.

However, such a transparent plastic film provided with a gas barrier capability has a problem in that scratches or pinholes may be formed in the gas barrier layer during the production process, and a deterioration in gas barrier capability may occur.

Patent Document 3 discloses a solar cell module surface protective sheet in which at least two gas barrier films including a polymer film, a resin coating layer, and an inorganic oxide deposited thin film layer are stacked.

However, when the gas barrier films are stacked, interfacial lifting may occur at the end of the laminate.

When using a plastic film for an electroluminescence device or an electronic device used outdoors, the plastic film may deteriorate due to UV rays emitted from the device or UV rays included in external light.

In order to solve the above problem, Patent Documents 4 and 5 propose providing a UV cut layer that includes a UV absorber on a gas barrier film.

However, the gas barrier films disclosed in Documents 4 and 5 exhibit a gas barrier capability, a UV cut capability, and optical properties in a poorly balanced manner, and may pose a problem when used for an electronic member.

RELATED-ART DOCUMENT

Patent Document

Patent Document 1: JP-A-2000-338901
Patent Document 2: JP-A-2006-123307
Patent Document 3: JP-A-2007-173449
Patent Document 4: JP-A-6-286046
Patent Document 5: JP-A-2006-297737

SUMMARY OF THE INVENTION

Technical Problem

The invention was conceived in view of the above situation. An object of the invention is to provide a gas barrier film laminate that exhibits a high water vapor barrier capability, and does not show interfacial lifting at the end thereof, a gas barrier film laminate that exhibits a high barrier capability, a high UV cut capability, and excellent optical properties, and an electronic member that includes the gas barrier film laminate.

Solution to Problem

The inventors of the invention conducted extensive studies in order to achieve the above object. As a result, the inventors found that (i) a gas barrier film laminate that exhibits a high water vapor barrier capability, and does not show interfacial lifting at the end thereof, can be obtained by bonding gas barrier films through a pressure-sensitive adhesive layer formed using a rubber-based pressure-sensitive adhesive composition, and (ii) a gas barrier film laminate that exhibits a high barrier capability, a high UV cut capability, and excellent optical properties, can be obtained by incorporating a specific UV absorber in the pressure-sensitive adhesive layer. These findings have led to the completion of the invention.

Several aspects of the invention provide the following gas barrier film laminate (see (1) to (4)) and electronic member (see (5)).

(1) A gas barrier film laminate including at least two gas barrier films and a pressure-sensitive adhesive layer, the at least two gas barrier films being stacked through the pressure-sensitive adhesive layer, at least one of the at least two gas barrier films including a base formed of a plastic film, and at least one gas barrier layer provided on the base, and the pressure-sensitive adhesive layer being a layer formed using a rubber-based pressure-sensitive adhesive composition that includes a rubber-based compound.

(2) The gas barrier film laminate according to (1), wherein the plastic film is a transparent plastic film, and the pressure-sensitive adhesive layer is formed using the rubber-based pressure-sensitive adhesive composition that further includes a benzotriazole-based UV absorber.

(3) The gas barrier film laminate according to (1) or (2), wherein the rubber-based compound is a polyisobutylene-based resin.

(4) The gas barrier film laminate according to (1) or (2), wherein the at least two gas barrier films are stacked through the pressure-sensitive adhesive layer so that the gas barrier layers face each other.

(5) An electronic member including the gas barrier film laminate according to (1) or (2).

Advantageous Effects of the Invention

The gas barrier film laminate according to one aspect of the invention exhibits a high water vapor barrier capability, and does not show interfacial lifting at the end thereof.

The gas barrier film laminate that includes the pressure-sensitive adhesive layer that includes the specific UV absorber exhibits an excellent UV cut capability, shows yellowing and haze to only a small extent, and exhibits excellent optical properties in addition to the above properties.

The gas barrier film laminate according to one aspect of the invention may be suitable for an electronic member such as a solar cell, a liquid crystal display, or an electroluminescence (EL) display.

DESCRIPTION OF EMBODIMENTS

Figure 1:
FIG. 1 is a cross-sectional view illustrating the layer configuration of an example of a gas barrier film laminate according to one embodiment of the invention.
Figure 1:
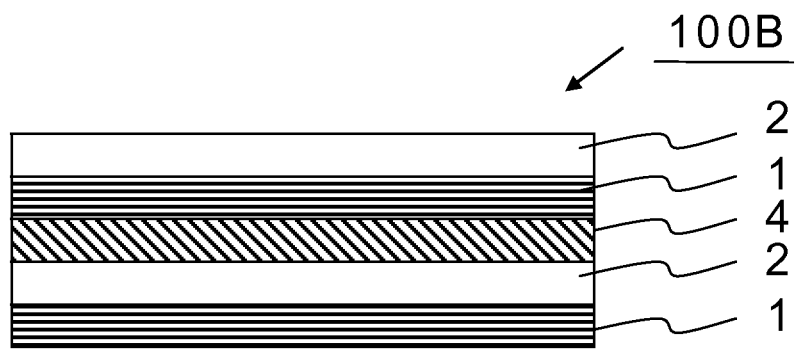

A gas barrier film laminate and an electronic member according to exemplary embodiments of the invention are described in detail below.

1) Gas Barrier Film Laminate

A gas barrier film laminate according to one embodiment of the invention includes at least two gas barrier films and a pressure-sensitive adhesive layer, the at least two gas barrier films being stacked through the pressure-sensitive adhesive layer, at least one of the at least two gas barrier films including a base formed of a plastic film, and at least one gas barrier layer provided on the base, and the pressure-sensitive adhesive layer being a layer formed using a rubber-based pressure-sensitive adhesive composition that includes a rubber-based compound.

Gas Barrier Film

The gas barrier film included in the gas barrier film laminate according to one embodiment of the invention is a film that allows gas (e.g., water vapor) to pass through to only a small extent.

At least one of the at least two gas barrier films included in the gas barrier film laminate according to one embodiment of the invention includes a base formed of a plastic film (hereinafter may be simply referred to as "base"), and at least one gas barrier layer provided on the base (hereinafter may be referred to as "gas barrier film (1)").

The water vapor transmission rate of the gas barrier film (1) at a temperature of 40° C. and a relative humidity of 90% is preferably 1.0 g/m$^2$/day or less, and more preferably 0.5 g/m$^2$/day or less.

The gas barrier film laminate according to one embodiment of the invention may include only the gas barrier films (1) as the at least two gas barrier films, or may include the gas barrier film (1), and a single-layer or multi-layer synthetic resin film having a water vapor transmission rate within the above range (hereinafter may be referred to as "gas barrier film (2)"). The gas barrier film laminate according to one embodiment of the invention preferably includes only the gas barrier films (1) as the at least two gas barrier films. In this case, the gas barrier films (1) included in the gas barrier film laminate may be either identical or different as to the type and the thickness of the base, the type and the thickness of the gas barrier layer, the layer configuration, and the like.

Base Formed of Plastic Film

The plastic film included in the gas barrier film (1) is not particularly limited as long as the gas barrier layer can be formed thereon. The plastic film is preferably a transparent plastic film. The term "transparent plastic film" used herein refers to a film formed of a plastic that has a visible light transmittance at a wavelength of 500 nm of 85% or more, and preferably 90% or more, when formed into a film having a thickness of 50 μm. A gas barrier film laminate that is suitable for an electronic member (e.g., liquid crystal display or electroluminescence display) can be obtained by utilizing a transparent plastic film.

Examples of a material for forming the base formed of the plastic film include polyimides, polyamides, polyamide-imides, polyphenylene ether, polyether ketone, polyether ether ketone, polyolefins, polyesters, polycarbonates, polysulfones, polyether sulfones, polyphenylene sulfides, polyallylates, acrylic resins, cycloolefin polymers, aromatic polymers, and the like.

Among these, polyesters, polyamides, or cycloolefin polymers are preferable, and polyesters or cycloolefin polymers are more preferable due to excellent transparency and versatility.

Examples of the polyesters include polyethylene terephthalate, polybuthylene terephthalate, polyethylene naphthalate, polyallylates, and the like. Examples of the polyamides include wholly aromatic polyamides, nylon 6, nylon 66, nylon copolymers, and the like.

Examples of the cycloolefin polymers include norbornene polymers, monocyclic olefin polymers, cyclic conjugated diene polymers, vinyl alicyclic hydrocarbon polymers, and hydrogenated products thereof.

The thickness of the base is normally 100 nm to 1000 μm, and preferably 5 to 200 μm.

Gas Barrier Layer

The gas barrier layer included in the gas barrier film (1) is a layer that exhibits a capability to suppress transmission (penetration) of oxygen and water vapor (hereinafter may be referred to as "gas barrier capability").

A material for forming the gas barrier layer is not particularly limited as long as the material suppresses transmission of gas (e.g., water vapor). It is preferable that the material for forming the gas barrier layer exhibit excellent transparency in addition to an excellent gas barrier capability.

The thickness of the gas barrier layer is not particularly limited, but is normally 20 nm to 50 μm, preferably 30 nm to 1 μm, and more preferably 40 to 500 nm.

Examples of the material for forming the gas barrier layer include metals such as aluminum, magnesium, zinc, and tin; inorganic oxides such as silicon oxide, aluminum oxide, magnesium oxide, zinc oxide, indium oxide, and tin oxide; inorganic nitrides such as silicon nitride; inorganic carbides; inorganic sulfides; inorganic oxynitrides (complexes); inorganic oxycarbides; inorganic carbonitrides; inorganic oxycarbonitrides; polymer compounds; and the like.

The gas barrier layer may be formed by an arbitrary method. For example, the gas barrier layer may be formed by a method that forms a layer of the above material on the base using a deposition method, a sputtering method, an ion plating method, a thermal CVD method, a plasma CVD method, or the like, a method that applies a solution prepared by dissolving or dispersing the above material in an organic solvent to the base using a known coating method, and appropriately dries the resulting film, or a method that subjects a polymer layer formed of a polymer compound to a plasma treatment.

Among these, it is preferable to employ the method that subjects a polymer layer formed of a polymer compound to a plasma treatment since the desired gas barrier layer can be easily formed. The polymer layer formed of the polymer compound is modified by the plasma treatment to exhibit an improved gas barrier capability.

The plasma treatment may be implemented by an arbitrary known method. It is preferable to use a plasma ion implantation method since a gas barrier layer that exhibits an excellent gas barrier capability can be efficiently formed.

In this case, the gas barrier layer formed by ion implantation does not refer to only the part modified by ion implantation, but refers to the polymer layer that includes the part modified by ion implantation.

Examples of the polymer compound that is used to form the polymer layer include silicon-based polymer compounds, polyimides, polyamides, polyamideimides, polyphenylene ethers, polyether ketones, polyether ether ketones, polyolefins, polyesters, polycarbonates, polysulfones, polyether sulfones, polyphenylene sulfides, polyallylates, acrylic-based resins, cycloolefin-based polymers, aromatic polymers, combinations of two or more polymers among these polymers, and the like.

The polymer compound may be a cured product of an energy ray-curable compound. Examples of the energy The main chain structure of the polyorganosiloxane-based compound is not particularly limited. The main chain structure of the polyorganosiloxane-based compound may be linear, ladder-like, or polyhedral.

Examples of the linear main chain structure of the polyorganosiloxane-based compound include a structure represented by the following formula (a). Examples of the ladder-like main chain structure of the polyorganosiloxane-based compound include a structure represented by the following formula (b). Examples of the polyhedral main chain structure of the polyorganosiloxane-based compound include a structure represented by the following formula (c).

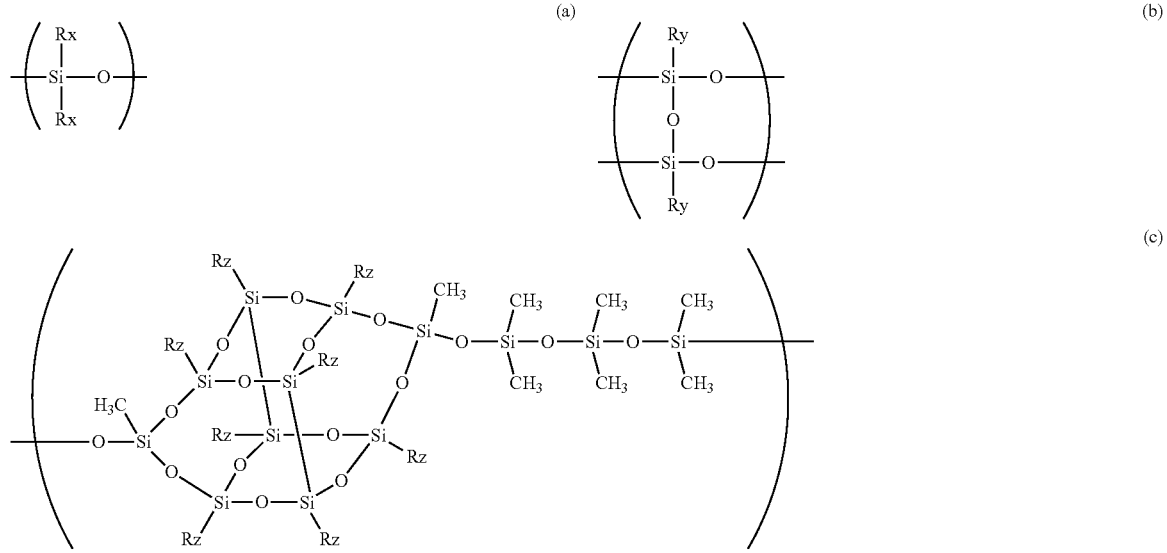

ray-curable compound include energy ray-polymerizable monomers such as polyfunctional acrylates such as 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, dicyclopentanyl di(meth)acrylate, isocyanurate di(meth)acrylate, trimethylolpropane tri(meth)acrylate, dipentaerythritol tri(meth)acrylate, pentaerythritol tri(meth)acrylate, tris (acryloxyethyl) isocyanurate, and dipentaerythritol hexa (meth)acrylate; polyfunctional acrylate oligomers such as polyester (meth)acrylate, epoxy (meth)acrylate, urethane (meth)acrylate, polyol (meth)acrylate, and silicone (meth) acrylate; and the like. Note that the term "(meth)acrylate" refers to "acrylate" or "methacrylate".

Among these, silicon-based polymer compounds, polyesters, or acrylic-based resins are preferable, and silicon-based polymer compounds are more preferable as the polymer compound since a gas barrier layer that exhibits an excellent gas barrier capability can be easily formed.

The silicon-based polymer compound may be either an organic compound or an inorganic compound as long as the silicon-based polymer compound is a polymer that includes silicon. Examples of the silicon-based polymer compound include a polyorganosiloxane-based compound, a polycarbosilane-based compound, a polysilane-based compound, a polysilazane-based compound, and the like.

The polyorganosiloxane-based compound is a compound obtained by polycondensing a silane compound that includes a hydrolyzable functional group (e.g., alkoxy group or halogen atom).

wherein Rx, Ry, and Rz are independently a hydrogen atom or a non-hydrolyzable group such as a substituted or unsubstituted alkyl group, a substituted or unsubstituted alkenyl group, or a substituted or unsubstituted aryl group. Note that a plurality of Rx in the formula (a), a plurality of Ry in the formula (b), and a plurality of Rz in the formula (c) may respectively be either identical or different, provided that a case where both Rx in the formula (a) are a hydrogen atom is excluded.

Examples of the alkyl group include alkyl groups having 1 to 10 carbon atoms (e.g., methyl group, ethyl group, n-propyl group, isopropyl group, n-butyl group, isobutyl group, sec-butyl group, t-butyl group, n-pentyl group, isopentyl group, neopentyl group, n-hexyl group, n-heptyl group, and n-octyl group).

Examples of the alkenyl group include alkenyl groups having 2 to 10 carbon atoms (e.g., vinyl group, 1-propenyl group, 2-propenyl group, 1-butenyl group, 2-butenyl group, and 3-butenyl group).

Examples of a substituent that may substitute the alkyl group and a substituent that may substitute the alkenyl group include halogen atoms such as a fluorine atom, a chlorine atom, a bromine atom, and an iodine atom; a hydroxyl group; a thiol group; an epoxy group; a glycidoxy group; a (meth)acryloyloxy group; substituted or unsubstituted aryl groups such as a phenyl group, a 4-methylphenyl group, and a 4-chlorophenyl group; and the like.

Examples of the aryl group include aryl groups having 6 to 10 carbon atoms (e.g., phenyl group, 1-naphthyl group, and 2-naphthyl group).

Examples of a substituent that may substitute the aryl group include halogen atoms such as a fluorine atom, a chlorine atom, a bromine atom, and an iodine atom; alkyl groups having 1 to 6 carbon atoms, such as a methyl group and an ethyl group; alkoxy groups having 1 to 6 carbon atoms, such as a methoxy group and an ethoxy group; a nitro group; a cyano group; a hydroxyl group; a thiol group; an epoxy group; a glycidoxy group; a (meth)acryloyloxy group; substituted or unsubstituted aryl groups such as a phenyl group, a 4-methylphenyl group, and a 4-chlorophenyl group; and the like.

Among these, a hydrogen atom, an alkyl group having 1 to 6 carbon atoms, or a phenyl group is preferable, and an alkyl group having 1 to 6 carbon atoms is particularly preferable as Rx, Ry, and Rz.

The polyorganosiloxane-based compound is preferably a linear compound represented by the formula (a), and more preferably a polydimethylsiloxane represented by the formula (a) in which both Rx are a methyl group, from the viewpoint of availability and a capability to form a layer that exhibits an excellent gas barrier capability.

The polyorganosiloxane-based compound may be obtained by a known production method that polycondenses a silane compound that includes a hydrolyzable functional group, for example.

The silane compound used to produce the polyorganosiloxane-based compound may be appropriately selected depending on the structure of the target polyorganosiloxane-based compound. Specific examples of a preferable silane compound include bifunctional silane compounds such as dimethyldimethoxysilane, dimethyldiethoxysilane, diethyldimethoxysilane, and diethyldiethoxysilane; trifunctional silane compounds such as methyltrimethoxysilane, methyltriethoxysilane, ethyltrimethoxysilane, ethyltriethoxysilane, n-propyltrimethoxysilane, n-butyltriethoxysilane, phenyltrimethoxysilane, phenyltriethoxysilane, and phenyldiethoxymethoxysilane; tetrafunctional silane compounds such as tetramethoxysilane, tetraethoxysilane, tetra-n-propoxysilane, tetraisopropoxysilane, tetra-n-butoxysilane, tetra-t-butoxysilane, tetra-s-butoxysilane, methoxytriethoxysilane, dimethoxydiethoxysilane, and trimethoxyethoxysilane; and the like.

The term "polycarbosilane-based compound" used herein refers to a polymer compound that includes an —Si—C— bond in the main chain of the molecule. A compound that includes a repeating unit represented by the following formula (d) is preferable as the polycarbosilane-based compound.

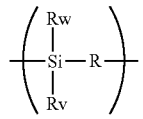
(d)

wherein Rw and Rv are independently a hydrogen atom, a hydroxyl group, an alkyl group, an aryl group, an alkenyl group, or a monovalent heterocyclic group, provided that a plurality of Rw and a plurality of Rv may respectively be either identical or different.

Examples of the alkyl group, the aryl group, and the alkenyl group represented by Rw and Rv include those mentioned above in connection with Rx and the like.

The heterocyclic ring of the monovalent heterocyclic group is not particularly limited as long as the heterocyclic ring is derived from a 3 to 10-membered cyclic compound that includes a carbon atom and at least one heteroatom (e.g., oxygen atom, nitrogen atom, or sulfur atom).

Specific examples of the monovalent heterocyclic group include a 2-pyridyl group, a 3-pyridyl group, a 4-pyridyl group, a 2-thienyl group, a 3-thienyl group, a 2-furyl group, a 3-furyl group, a 3-pyrazolyl group, a 4-pyrazolyl group, a 2-imidazolyl group, a 4-imidazolyl group, a 1,2,4-triazin-3-yl group, a 1,2,4-triazin-5-yl group, a 2-pyrimidyl group, a 4-pyrimidyl group, a 5-pyrimidyl group, a 3-pyridazyl group, a 4-pyridazyl group, a 2-pyrazyl group, a 2-(1,3,5-triazyl) group, a 3-(1,2,4-triazyl) group, a 6-(1,2,4-triazyl) group, a 2-thiazolyl group, a 5-thiazolyl group, a 3-isothiazolyl group, a 5-isothiazolyl group, a 2-(1,3,4-thiadiazolyl) group, a 3-(1,2,4-thiadiazolyl) group, a 2-oxazolyl group, a 4-oxazolyl group, a 3-isoxazolyl group, a 5-isoxazolyl group, a 2-(1,3,4-oxadiazolyl) group, a 3-(1,2,4-oxadiazolyl) group, a 5-(1,2,3-oxadiazolyl) group, and the like.

These groups may be substituted with a substituent (e.g., alkyl group, aryl group, alkoxy group, or aryloxy group) at an arbitrary position.

R is an alkylene group, an arylene group, or a divalent heterocyclic group.

Examples of the alkylene group represented by R include alkylene groups having 1 to 10 carbon atoms, such as a methylene group, an ethylene group, a propylene group, a trimethylene group, a tetramethylene group, a pentamethylene group, a hexamethylene group, and an octamethylene group.

Examples of the arylene group include arylene groups having 6 to 20 carbon atoms, such as a p-phenylene group, a 1,4-naphthylene group, a 1,5-naphthylene group, and a 2,6-naphthylene group.

The divalent heterocyclic group is not particularly limited as long as the divalent heterocyclic group is a divalent group derived from a 3 to 10-membered cyclic compound that includes a carbon atom and at least one heteroatom (e.g., oxygen atom, nitrogen atom, or sulfur atom).

Specific examples of the divalent heterocyclic group include a thiophenediyl group such as a 2,5-thiophenediyl group; a furandiyl group such as a 2,5-furandiyl group; a selenophenediyl group such as a 2,5-selenophenediyl group; a pyrrolediyl group such as a 2,5-pyrrolediyl group; a pyridinediyl group such as a 2,5-pyridinediyl group and a 2,6-pyridinediyl group; a thiophenediyl group such as a 2,5-thieno[3,2-b]thiophenediyl group and a 2,5-thieno[2,3-b]thiophenediyl group; a quinolinediyl group such as a 2,6-quinolinediyl group; an isoquinolinediyl group such as a 1,4-isoquinolinediyl group and a 1,5-isoquinolinediyl group; a quinoxalinediyl group such as a 5,8-quinoxalinediyl group; a benzo[1,2,5]thiadiazolediyl group such as a 4,7-benzo[1,2,5]thiadiazolediyl group; a benzothiazolediyl group such as a 4,7-benzothiazolediyl group; a carbazolediyl group such as a 2,7-carbazolediyl group and a 3,6-carbazolediyl group; a phenoxazinediyl group such as a 3,7-phenoxazinediyl group; a phenothiazinediyl group such as a 3,7-phenothiazinediyl group; a dibenzosilolediyl group such as a 2,7-dibenzosilolediyl group; a benzodithiophenediyl group such as a 2,6-benzo[1,2-b:4,5-b']dithiophenediyl group, 2,6-benzo[1,2-b:5,4-b']dithiophenediyl group, 2,6-benzo[2,1-b:3,4-b']dithiophenediyl group, 2,6-benzo[1,2-b:3,4-b']dithiophenediyl group; and the like.

The alkylene group, the arylene group, and the divalent heterocyclic group represented by R may be substituted with a substituent (e.g., alkyl group, aryl group, alkoxy group, or halogen atom) at an arbitrary position.

It is preferable to use a polycarbosilane-based compound that includes the repeating unit represented by the formula (d) in which Rw and Rv are independently a hydrogen atom, an alkyl group, or an aryl group, and R is an alkylene group or an arylene group. It is more preferable to use a polycarbosilane-based compound that includes the repeating unit represented by the formula (d) in which Rw and Rv are independently a hydrogen atom or an alkyl group, and R is an alkylene group.

The weight average molecular weight of the polycarbosilane-based compound that includes the repeating unit represented by the formula (d) is normally 400 to 12,000.

The polycarbosilane-based compound may be produced by an arbitrary known method. For example, the polycarbosilane-based compound may be produced a method that produces a polycarbosilane-based compound by thermal decomposition and polymerization of a polysilane (JP-A-51-126300), a method that produces a polycarbosilane-based compound by thermal rearrangement of poly(dimethylsilane) (Journal of Materials Science, 2569-2576, Vol. 13, 1978), a method that produces a polycarbosilane-based compound by a Grignard reaction of chloromethyltrichlorosilane (Organometallics, 1336-1344, Vol. 10, 1991), a method that produces a polycarbosilane-based compound by ring-opening polymerization of a disilacyclobutane (Journal of Organometallic Chemistry, 1-10, Vol. 521, 1996), a method that produces a polycarbosilane-based compound by reacting water and/or an alcohol with a raw material polymer that includes a dimethylcarbosilane structural unit and an SiH group-containing silane structural unit in the presence of a basic catalyst (JP-A-2006-117917), a method that produces a polycarbosilane-based compound by polymerizing a carbosilane that includes an organometallic group (e.g., trimethyltin) at the end using an organic main-group metal compound (e.g., n-butyllithium) as an initiator (JP-A-2001-328991), or the like.

The term "polysilane-based compound" used herein refers to a polymer compound that includes an —Si—Si— bond in its molecule. Examples of the polysilane-based compound include a compound that includes at least one repeating unit selected from structural units represented by the following formula (e).

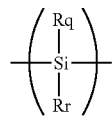

(e)

wherein Rq and Rr are independently a hydrogen atom, an alkenyl group, a cycloalkyl group, a cycloalkenyl group, an aryl group, a hydroxyl group, an alkoxy group, a cycloalkyloxy group, an aryloxy group, an aralkyloxy group, a substituted or unsubstituted amino group, a silyl group, or a halogen atom.

Examples of the alkyl group, the alkenyl group, and the aryl group represented by Rq and Rr include those mentioned above in connection with Rx and the like.

Examples of the cycloalkyl group include cycloalkyl groups having 3 to 10 carbon atoms, such as a cyclopentyl group, a cyclohexyl group, and a methylcyclohexyl group. Examples of the cycloalkenyl group include cycloalkenyl groups having 4 to 10 carbon atoms, such as a cyclopentenyl group and a cyclohexenyl group.

Examples of the alkoxy group include alkoxy groups having 1 to 10 carbon atoms, such as a methoxy group, an ethoxy group, a propoxy group, an isopropoxy group, a butoxy group, a t-butoxy group, and a pentyloxy group.

Examples of the cycloalkyloxy group include cycloalkyloxy groups having 3 to 10 carbon atoms, such as a cyclopenthyloxy group and a cyclohexyloxy group.

Examples of the aryloxy group include aryloxy groups having 6 to 20 carbon atoms, such as a phenoxy group and a naphthyloxy group.

Examples of the aralkyloxy group include aralkyloxy groups having 7 to 20 carbon atoms, such as a benzyloxy group, a phenethyloxy group, and a phenylpropyloxy group.

Examples of the substituted or unsubstituted amino group include an amino group; N-monosubstituted or N,N-disubstituted amino groups substituted with an alkyl group, a cycloalkyl group, an aryl group, an aralkyl group, an acyl group, or the like; and the like.

Examples of the silyl group include a silyl group, silanyl groups having 1 to 10 silicon atoms (preferably silanyl groups having 1 to 6 silicon atoms), such as a disilanyl group and a trisilanyl group, substituted silyl groups (e.g., a substituted silyl group substituted with an alkyl group, a cycloalkyl group, an aryl group, an aralkyl group, an alkoxy group, or the like), and the like.

Examples of the halogen atom include a fluorine atom, a chlorine atom, a bromine atom, an iodine atom, and the like.

The cycloalkyl group, the cycloalkenyl group, the alkoxy group, the cycloalkyloxy group, the aryloxy group, the aralkyloxy group, and the silyl group may be substituted with a substituent (e.g., halogen atom, alkyl group, aryl group, or alkoxy group).

It is preferable to use a polysilane-based compound that includes the repeating unit represented by the formula (e), more preferably a polysilane-based compound that includes the repeating unit represented by the formula (e) in which Rq and Rr are independently a hydrogen atom, a hydroxyl group, an alkyl group, an aryl group, an alkoxy group, an amino group, or a silyl group, and still more preferably a polysilane-based compound that includes the repeating unit represented by the formula (e) in which Rq and Rr are independently a hydrogen atom, an alkyl group, or an aryl group, since more excellent effects can be obtained.

The configuration of the polysilane-based compound is not particularly limited. The polysilane-based compound may be a homopolymer (e.g., noncyclic polysilane (e.g., linear polysilane, branched polysilane, or network polysilane) or cyclic polysilane), or may be a copolymer (e.g., random copolymer, block copolymer, alternating copolymer, or comb-like copolymer).

When the polysilane-based compound is a noncyclic polysilane, the end group (end substituent) of the polysilane-based compound may be a hydrogen atom, a halogen atom (e.g., chlorine atom), an alkyl group, a hydroxyl group, an alkoxy group, a silyl group, or the like.

Specific examples of the polysilane-based compound include homopolymers such as a polydialkylsilane such as polydimethylsilane, poly(methylpropylsilane), poly(methylbutylsilane), poly(methylpentylsilane), poly(dibutylsilane), and poly(dihexylsilane), a polydiarylsilane such as poly(diphenylsilane), and a poly(alkylarylsilane) such as poly(methylphenylsilane); copolymers such as a copolymer of a dialkylsilane and another dialkylsilane (e.g., dimethylsilane-methylhexylsilane copolymer), an arylsilane-alkylarylsilane copolymer (e.g., phenylsilane-methylphenylsilane copolymer), and a dialkylsilane-alkylarylsilane copolymer (e.g., dimethylsilane-methylphenylsilane copolymer, dimethylsilane-phenylhexylsilane copolymer, dimethylsilane-methylnaphthylsilane copolymer, and methylpropylsilane-methylphenylsilane copolymer); and the like.

The details of the polysilane-based compound are described in R. D. Miller and J. Michl, Chemical Review, Vol. 89, p. 1359 (1989), N. Matsumoto, Japanese Journal of Physics, Vol. 37, p. 5425 (1998), and the like. The polysilane-based compounds described in these documents may be used as the polysilane-based compound.

The average degree of polymerization (e.g., number average degree of polymerization) of the polysilane-based compound is normally about 5 to about 400, preferably about 10 to about 350, and more preferably about 20 to about 300.

The weight average molecular weight of the polysilane-based compound is about 300 to about 100,000, preferably about 400 to about 50,000, and more preferably about 500 to about 30,000.

A number of polysilane-based compounds are known in the art. Such polysilane-based compounds may be produced by a known method. For example, the polysilane-based compound may be produced by a method that subjects a halosilane to dehalogenation/polycondensation using magnesium as a reducing agent (magnesium reduction method, see WO98/29476, for example), a method that subjects a halosilane to dehalogenation/polycondensation in the presence of an alkali metal (Kipping method, see J. Am. Chem. Soc., 110, 124 (1988), Macromolecules, 23, 3423 (1990), for example), a method that subjects a halosilane to dehalogenation/polycondensation by electrode reduction (see J. Chem. Soc., Chem. Commun, 1161 (1990), J. Chem. Soc., Chem. Commun 897 (1992), for example), a method that subjects a hydrosilane to dehydrogenation/condensation in the presence of a specific polymerization metal catalyst (see JP-A-4-334551, for example), a method that subjects a disilene crosslinked using a biphenyl or the like to anionic polymerization (see Macromolecules, 23, 4494 (1990), for example), a method that subjects a cyclic silane to ring-opening polymerization, or the like.

The polysilazane-based compound is preferably a compound that includes a repeating unit represented by the following formula (f).

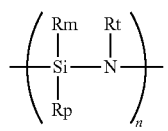

(f)

The number average molecular weight of the polysilazane-based compound is not particularly limited, but is preferably 100 to 50,000.

In the formula (f), n is an arbitrary natural number.

$Rm$, $Rp$, and $Rt$ are independently a non-hydrolyzable group (e.g., hydrogen atom, alkyl group, cycloalkyl group, alkenyl group, aryl group, or alkylsilyl group).

Examples of the alkyl group, the alkenyl group, and the aryl group include those mentioned above in connection with $Rx$ and the like.

Examples of the cycloalkyl group include those mentioned above in connection with $Rq$ and the like.

Examples of the alkylsilyl group include a trimethylsilyl group, a triethylsilyl group, a triisopropylsilyl group, a tri-t-butylsilyl group, a methyldiethylsilyl group, a dimethylsilyl group, a diethylsilyl group, a methylsilyl group, an ethylsilyl group, and the like.

Among these, a hydrogen atom, an alkyl group having 1 to 6 carbon atoms, or a phenyl group is preferable as $Rm$, $Rp$, and $Rt$. A hydrogen atom is particularly preferable as $Rm$, $Rp$, and $Rt$.

The polysilazane-based compound that includes the repeating unit represented by the formula (h) may be an inorganic polysilazane in which each of $Rm$, $Rp$, and $Rt$ is a hydrogen atom, or an organic polysilazane in which at least one of $Rm$, $Rp$, and $Rt$ is not a hydrogen atom.

Examples of the inorganic polysilazane include a perhydropolysilazane that has a linear structure that includes a repeating unit represented by the following formula, has a molecular weight of 690 to 2000, and includes three to ten $SiH_3$ groups in one molecule (see JP-B-63-16325),

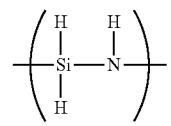

a perhydropolysilazane that has a linear structure and a branched structure, and includes a repeating unit represented by the following formula (A),

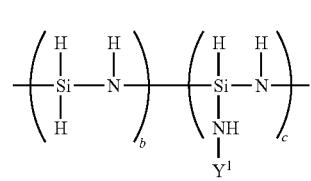

(A)

wherein b and c are arbitrary natural numbers, and $Y^1$ is a hydrogen atom or a group represented by the following formula (B),

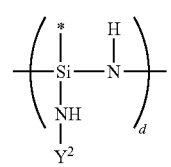

(B)

wherein d is an arbitrary natural number, * indicates the bonding position, and $Y^2$ is a hydrogen atom or a group represented by the formula (B), a perhydropolysilazane that has a linear structure, a branched structure, and a cyclic structure in its molecule, and includes the perhydropolysilazane structure represented by the following formula (C),

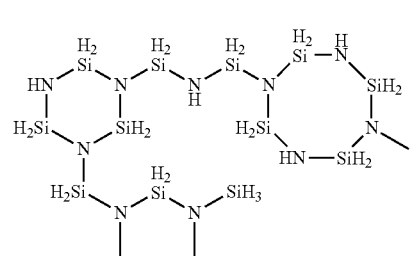

(C)

and the like.

Examples of the organic polysilazane include:
(i) a polysilazane that includes a repeating unit represented by -($Rm'$SiHNH)— (wherein $Rm'$ is an alkyl group, a cycloalkyl group, an alkenyl group, an aryl group, or an alkylsilyl group similar to those represented by Rm (hereinafter the same)), and has a cyclic structure having a degree of polymerization of 3 to 5;

(ii) a polysilazane that includes a repeating unit represented by -(Rm'SiHNRt')- (wherein Rt' is an alkyl group, a cycloalkyl group, an alkenyl group, an aryl group, or an alkylsilyl group similar to those represented by Rt), and has a cyclic structure having a degree of polymerization of 3 to 5;

(iii) a polysilazane that includes a repeating unit represented by -(Rm'Rp'SiNH)— (wherein Rp' is an alkyl group, a cycloalkyl group, an alkenyl group, an aryl group, or an alkylsilyl group similar to those represented by Rp), and has a cyclic structure having a degree of polymerization of 3 to 5;

(iv) a polyorgano(hydro)silazane that includes a structure represented by the following formula in the molecule;

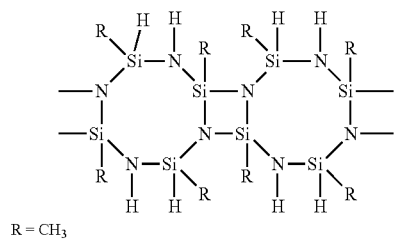

R = CH₃

(v) a polysilazane that includes a repeating unit represented by the following formula,

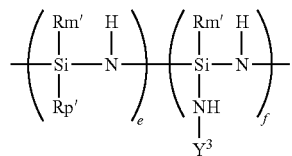

wherein Rm' and Rp' are the same as defined above, e and f are arbitrary natural numbers, and $Y^3$ is a hydrogen atom or a group represented by the following formula (D),

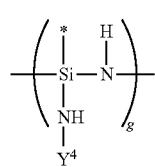
(D)

wherein g is an arbitrary natural number, * indicates the bonding position, and $Y^4$ is a hydrogen atom or the group represented by the formula (D); and the like.

The above organic polysilazanes may be produced by a known method.

For example, the above organic polysilazanes may be produced by reacting ammonia or a primary amine with a reaction product of a secondary amine and a substituted or unsubstituted halogenosilane compound represented by the following formula.

wherein m is 2 or 3, X is a halogen atom, and $R^1$ is a substituent that substitutes Rm, Rp, Rt, Rm', Rp', or Rt'.

The secondary amine, ammonia, and the primary amine may be appropriately selected depending on the structure of the target polysilazane-based compound.

A modified polysilazane may be used as the polysilazane-based compound. Examples of the modified polysilazane include a polymetallosilazane that includes a metal atom (which may be crosslinked), a polysiloxazane that includes a repeating unit represented by $(SiH_2)_j(NH)_h$ and a repeating unit represented by $(SiH_2)_iO$ (wherein j, h, and i are independently 1, 2, or 3) (see JP-A62-195024), a polyborosilazane produced by reacting a polysilazane with a boron compound (see JP-A-2-84437), a polymetallosilazane produced by reacting a polysilazane with a metal alkoxide (see JP-A-63-81122, for example), an inorganic silazane polymer and a modified polysilazane (see JP-A-1-138108, for example), a copolymer silazane produced by introducing an organic component into a polysilazane (see JP-A-2-175726, for example), a low-temperature ceramic polysilazane obtained by adding a ceramic-forming catalyst compound to a polysilazane (see JP-A-5-238827, for example), a silicon alkoxide-addition polysilazane (see JP-A-5-238827), a glycidol-addition polysilazane (see JP-A-6-122852), an acetylacetonato complex-addition polysilazane (see JP-A-6-306329), a metal carboxylate-addition polysilazane (see JP-A-6-299118, for example), a polysilazane composition produced by adding an amine and/or acid to the above polysilazane or modified polysilazane (see JP-A-9-31333), a modified polysilazane produced by adding an alcohol (e.g., methanol) or hexamethyldisilazane to the terminal nitrogen (N) atom of perhydropolysilazane (see JP-A-5-345826 and JP-A-4-63833), and the like.

The polysilazane-based compound used in connection with the embodiments of the invention is preferably an inorganic polysilazane in which each of Rm, Rp, and Rt is a hydrogen atom, or an organic polysilazane in which at least one of Rm, Rp, and Rt is not a hydrogen atom, and more preferably an inorganic polysilazane from the viewpoint of availability and a capability to form an implanted layer that exhibits an excellent gas barrier capability.

A product commercially available as a glass coating material or the like may be used directly as the polysilazane-based compound.

The polymer layer may include an additional component other than the polymer compound as long as the object of the invention is not impaired. Examples of the additional component include a curing agent, an additional polymer, an aging preventive, a light stabilizer, a flame retardant, and the like.

The content of the polymer compound in the polymer layer is preferably 50 mass % or more, and more preferably 70 mass % or more, from the viewpoint of forming a gas barrier layer that exhibits an excellent gas barrier capability.

The polymer layer may be formed by an arbitrary method. For example, the polymer layer may be formed by applying a layer-forming solution that includes at least one polymer compound, an optional additional component, a solvent, and the like to the base on a primer layer optionally formed on the base using a known coating method, and appropriately drying the resulting film.

A spin coater, a knife coater, a gravure coater, or the like may be used to apply the layer-forming solution.

It is preferable to heat the resulting film in order to improve the film drying efficiency and the gas barrier capability of the film. The film may be heated and dried using a known drying method such as hot-air drying, heat roll drying, or infrared irradiation. The heating temperature is normally 80 to 150° C. The heating time is normally several tens of seconds to several tens of minutes.

The thickness of the polymer layer is not particularly limited, but is normally 20 to 1000 nm, preferably 30 to 500 nm, and more preferably 40 to 200 nm.

According to the embodiments of the invention, a film that exhibits a sufficient gas barrier capability can be obtained by implanting ions as described below, even when the polymer layer has a thickness at a nanometer level.

The dose of the ions implanted into the polymer layer may be appropriately determined depending on the intended use of the resulting film (e.g., desired gas barrier capability and transparency), and the like.

Examples of the ions implanted into the polymer layer include ions of a rare gas such as argon, helium, neon, krypton, or xenon; ions of a fluorocarbon, hydrogen, nitrogen, oxygen, carbon dioxide, chlorine, fluorine, sulfur, or the like; ions of an alkane gas such as methane, ethane, propane, butane, pentane, and hexane; ions of an alkene gas such as ethylene, propylene, butene, and pentene; ions of an alkadiene gas such as pentadiene and butadiene; ions of an alkyne gas such as acetylene and methylacetylene; ions of an aromatic hydrocarbon gas such as benzene, toluene, xylene, indene, naphthalene, and phenanthrene; ions of a cycloalkane gas such as cyclopropane and cyclohexane; ions of a cycloalkene gas such as cyclopentene and cyclohexene; ions of conductive metals such as gold, silver, copper, platinum, nickel, palladium, chromium, titanium, molybdenum, niobium, tantalum, tungsten, and aluminum; ions of silane ($SiH_4$) or an organosilicon compound; and the like.

Examples of the organosilicon compound include tetraalkoxysilanes such as tetramethoxysilane, tetraethoxysilane, tetra-n-propoxysilane, tetraisopropoxysilane, tetra-n-butoxysilane, and tetra-t-butoxysilane; substituted or unsubstituted alkylalkoxysilanes such as dimethyldimethoxysilane, dimethyldiethoxysilane, diethyldimethoxysilane, methyltriethoxysilane, ethyltrimethoxysilane, and (3,33-trifluoropropyl)trimethoxysilane; arylalkoxysilanes such as diphenyldimethoxysilane and phenyltriethoxysilane; disiloxanes such as hexamethyldisiloxane (HMDSO); aminosilanes such as bis(dimethylamino)dimethylsilane, bis(dimethylamino)methylvinylsilane, bis(ethylamino)dimethylsilane, diethylaminotrimethylsilane, dimethylaminodimethylsilane, tetrakisdimethylaminosilane, and tris(dimethylamino)silane; silazanes such as hexamethyldisilazane, hexamethylcyclotrisilazane, heptamethyldisilazane, nonamethyltrisilazane, octamethylcyclotetrasilazane, and tetramethyldisilazane; cyanatosilanes such as tetraisocyanatosilane; halogenosilanes such as triethoxyfluorosilane; alkenylsilanes such as diallyldimethylsilane and allyltrimethylsilane; substituted or unsubstituted alkylsilanes such as di-t-butylsilane, 1,3-disilabutane, bis(trimethylsilyl)methane, tetramethylsilane, tris(trimethylsilyl)methane, tris(trimethylsilyl)silane, and benzyltrimethylsilane; silylalkynes such as bis(trimethylsilyl)acetylene, trimethylsilylacetylene, and 1-(trimethylsilyl)-1-propyne; silylalkenes such as 1,4-bistrimethylsilyl-1,3-butadiyne and cyclopentadienyltrimethylsilane; arylalkylsilanes such as phenyldimethylsilane and phenyltrimethylsilane; alkynylalkylsilanes such as propargyltrimethylsilane; alkenylalkylsilanes such as vinyltrimethylsilane; disilanes such as hexamethyldisilane; siloxanes such as octamethylcyclotetrasiloxane, tetramethylcyclotetrasiloxane, and hexamethylcyclotetrasiloxane; N,O-bis(trimethylsilyl)acetamide; bis(trimethylsilyl)carbodiimide; and the like.

These compounds (ions) may be used either alone or in combination.

It is preferable to use ions of at least one element selected from the group consisting of hydrogen, nitrogen, oxygen, argon, helium, neon, xenon, and krypton from the viewpoint of ease of implantation and a capability to form a gas barrier layer that exhibits a particularly excellent gas barrier capability.

The ions may be implanted by an arbitrary method. For example, the ions may be implanted by applying ions (ion beams) accelerated by an electric field, implanting ions present in plasma (plasma ion implantation method), or the like. It is preferable to use the plasma ion implantation method since a gas barrier film can be easily obtained.

It is preferable to use a plasma ion implantation method (A) that implants ions present in plasma generated by utilizing an external electric field into the surface area of the polymer layer, or a plasma ion implantation method (B) that implants ions present in plasma generated due to an electric field produced by applying a negative high-voltage pulse to the polymer layer into the surface area of the polymer layer.

When using the method (A), it is preferable to set the ion implantation pressure (plasma ion implantation pressure) to 0.01 to 1 Pa. When the ion implantation pressure is within the above range, the ions can be easily, efficiently, and uniformly implanted, and the target gas barrier layer can be efficiently formed.

The method (B) has advantages in that it is unnecessary to increase the degree of decompression, the operation is simple, and the processing time can be significantly reduced. The method (B) has further advantages in that the entire polymer layer can be uniformly processed, and the ions present in the plasma can be continuously implanted into the surface area of the polymer layer with high energy by applying a negative high-voltage pulse. The method (B) has still another advantage in that an excellent ion-implanted layer can be uniformly formed in the surface area of the polymer layer merely by applying a negative high-voltage pulse to the polymer layer without requiring a special means such as a high-frequency power supply (e.g., radio frequency (RF) power supply or microwave power supply).

When using the method (A) or (B), the pulse width when applying a negative high-voltage pulse (i.e., during ion implantation) is preferably 1 to 15 msec. When the pulse width is within the above range, the ions can be easily, efficiently, and uniformly implanted.

The applied voltage used when generating the plasma is preferably −1 to −50 kV, more preferably −1 to −30 kV, and particularly preferably −5 to −20 kV. If the applied voltage is higher than −1 kV, the ion implantation dose may be insufficient, and the desired performance may not be obtained. If the applied voltage is lower than −50 kV, unfavorable matter may occur. For example, the laminate may be unfavorably charged during ion implantation or the laminate may be unfavorably colored.

Examples of the ion species used for plasma ion implantation include those mentioned above.

A plasma ion implantation apparatus is used when implanting the ions present in the plasma into the surface area of the polymer layer.

Specific examples of the plasma ion implantation apparatus include (α) a plasma ion implantation apparatus that causes the polymer layer (hereinafter may be referred to as "ion implantation target layer") to be evenly surrounded by plasma by superimposing high-frequency electric power on a feed-through that applies a negative high-voltage pulse to the ion implantation target layer so that ions present in the plasma are attracted to and collide with the target, and thereby implanted and deposited therein (JP-A-2001-26887), (β) a plasma ion implantation apparatus that includes an antenna in a chamber, wherein high-frequency electric power is applied to generate plasma, and positive and negative pulses are alternately applied to the ion implantation target layer after the plasma has reached an area around the ion implantation target layer, so that ions present in the plasma are attracted to and implanted into the target while heating the ion implantation target layer, causing electrons present in the plasma to be attracted to and collide with the target due to the positive pulse, and applying the negative pulse while controlling the temperature by controlling the pulse factor (JP-A-2001-156013), (γ) a plasma ion implantation apparatus that generates plasma using an external electric field utilizing a high-frequency electric power supply such as a microwave power supply, and causes ions present in the plasma to be attracted to and implanted into the target by applying a high voltage pulse, (δ) a plasma ion implantation apparatus that implants ions present in plasma generated due to an electric field produced by applying a high voltage pulse without using an external electric field, and the like.

It is preferable to use the plasma ion implantation apparatus (γ) or (δ) since the plasma ion implantation apparatus (γ) or (δ) allows a simple operation, significantly reduces the processing time, and can be continuously used.

Examples of a method that utilizes the plasma ion implantation apparatus (γ) or (δ) include the method disclosed in WO2010/021326.

Since the plasma ion implantation apparatus (γ) or (δ) is configured so that the high-voltage pulse power supply also serves as a plasma generation means that generates plasma, a special means such as a high-frequency electric power supply (e.g., RF power supply or microwave power supply) is unnecessary. The plasma can be generated, and the ions can be continuously implanted into the surface area of the polymer layer by merely applying a negative high-voltage pulse. This makes it possible to mass-produce a gas barrier film provided with the polymer layer (gas barrier layer) of which the surface area has been modified by ion implantation.

The thickness of the ion implantation target area may be controlled by adjusting the implantation conditions (e.g., type of ions, applied voltage, and implantation time), and may be determined depending on the thickness of the polymer layer, the intended use of the gas barrier film, and the like. The thickness of the ion implantation target area is normally 10 to 1000 nm.

Whether or not ions have been implanted may be determined by performing elemental analysis on a surface area of the polymer layer having a depth up to about 10 nm using X-ray photoelectron spectroscopy (XPS).

The gas barrier layer may be formed on one side of the base formed of the plastic film, or may be formed on each side of the base formed of the plastic film. The gas barrier layer may be a single layer, or may be a laminate in which a plurality of layers are continuously stacked.

Examples of the gas-barrier film (2) include a single-layer or multi-layer synthetic resin film. Specific examples of the gas barrier film (2) include a single-layer or multi-layer synthetic resin film formed of one synthetic resin or two or more synthetic resins among polyvinyl alcohol, polyethylene terephthalate, very-low-density polyethylene, polyvinyl chloride, polyvinylidene chloride, a fluororesin, a polyamide-based resin, an ethylene-vinyl alcohol copolymer, polyphenylene sulfide, polyacrylonitrile, and the like.

Pressure-Sensitive Adhesive Layer

The gas barrier film laminate according to one embodiment of the invention has a structure in which at least two gas barrier films are stacked through the pressure-sensitive adhesive layer.

The pressure-sensitive adhesive layer included in the gas barrier film laminate according to one embodiment of the invention is a layer formed using the rubber-based pressure-sensitive adhesive composition that includes the rubber-based compound. The pressure-sensitive adhesive layer formed using the rubber-based pressure-sensitive adhesive composition exhibits a low water vapor transmission rate and high adhesion. Therefore, it is possible to obtain a gas barrier film laminate in which transmission of water vapor through the end of the pressure-sensitive adhesive layer can be suppressed, and lifting rarely occurs at the end thereof when at least two gas barrier films are stacked through the pressure-sensitive adhesive layer.

Examples of the rubber-based compound include a natural rubber; a modified natural rubber obtained by graft polymerization of a natural rubber and one monomer or two or more monomers selected from an alkyl (meth)acrylate, styrene, and (meth)acrylonitrile; a diene-based homopolymer such as polybutadiene, polyisoprene, and polychloroprene; a diene-based copolymer such as a polystyrene-polybutadiene copolymer and a polystyrene-polyisoprene copolymer; a synthetic rubber such as a styrene-butadiene rubber, an acrylonitrile-butadiene rubber, a methyl methacrylate-butadiene rubber, and a urethane rubber; a polyisobutylene-based resin; a polybutene resin; and the like.

These rubber-based compounds may be used either alone or in combination.

The rubber-based pressure-sensitive adhesive composition preferably includes a polyisobutylene-based resin as the rubber-based compound, and more preferably includes a polyisobutylene-based resin and a polybutene resin as the rubber-based compound. A gas barrier film laminate in which lifting rarely occurs at the end thereof even when subjected to high-temperature/high-humidity conditions for a long time can be obtained by forming the pressure-sensitive adhesive layer using the rubber-based pressure-sensitive adhesive composition that includes the above rubber-based compound.

The term "polyisobutylene-based resin" used herein refers to a resin that includes a polyisobutylene skeleton (see the following structural unit (g)) in the main chain or the side chain.

Specific examples of the polyisobutylene-based resin include polyisobutylene (isobutylene homopolymer), a copolymer of isobutylene and isoprene, a copolymer of isobutylene and n-butene, a copolymer of isobutylene and butadiene, halogenated butyl rubbers obtained by bromination or chlorination of these copolymers, and the like. When the polyisobutylene-based resin is a copolymer of isobutylene and n-butene, isobutylene is used as the main raw material monomer (i.e., a monomer that is used in a maximum amount). These polyisobutylene-based resins may be used either alone or in combination.

(g)

The weight average molecular weight of the rubber-based compound is preferably 10,000 to 3,000,000, more preferably 200,000 to 2,000,000, and still more preferably 500,000 to 2,000,000. When the weight average molecular weight of the rubber-based compound is within the above range, the cohesive force of the rubber-based pressure-sensitive adhesive composition does not increase to a large extent, and a sufficient anchor effect can be obtained.

The content (on a solid basis) of the rubber-based compound in the rubber-based pressure-sensitive adhesive composition is preferably 20 mass % or more, more preferably 30 to 100 mass %, and still more preferably 50 to 95 mass %. When the content of the rubber-based compound is within the above range, it is possible to form a pressure-sensitive adhesive layer that exhibits a low water vapor transmission rate and excellent adhesion.

The rubber-based pressure-sensitive adhesive composition may further include a cyclic olefin-based polymer. The cyclic olefin-based polymer is useful for adjusting the viscosity when applying the rubber-based pressure-sensitive adhesive composition, improving flexibility through a plastic effect, improving the initial adhesion through an improvement in wettability, and increasing the cohesive force, for example.

The term "cyclic olefin-based polymer" used herein refers to a polymer that includes a repeating unit derived from a cyclic olefin-based monomer. Specific examples of the cyclic olefin-based polymer include a hydrogenated petroleum resin obtained by hydrogenating a petroleum resin known as a tackifier, and the like. These cyclic olefin-based polymers may be used either alone or in combination.

The content (on a solid basis) of the cyclic olefin-based polymer in the rubber-based pressure-sensitive adhesive composition is preferably 1 mass % or more, more preferably 5 to 50 mass %, and still more preferably 10 to 30 mass %.

The rubber-based pressure-sensitive adhesive composition may include a known photoinitiator and a known photosensitizer. Examples of the photoinitiator include an intramolecular cleavage-type photoinitiator and a hydrogen abstraction-type photoinitiator. It is preferable to use the hydrogen abstraction-type photoinitiator.

The hydrogen abstraction-type photoinitiator causes a plurality of polymer radicals to be generated in the rubber-based compound, and to react with and bond to each other so that the rubber-based compounds are crosslinked. This makes it possible to increase the crosslink density and the cohesive force of the pressure-sensitive adhesive layer. The water vapor transmission rate of the pressure-sensitive adhesive layer can thus be further reduced.

Examples of the hydrogen abstraction-type photoinitiator include benzophenone compounds such as acetophenone, benzophenone, methyl o-benzoylbenzoate, 4-phenylbenzophenone, 4,4'-dichlorobenzophenone, hydroxybenzophenone, 4,4'-dimethoxybenzophenone, 4,4'-dichlorobenzophenone, 4,4'-dimethylbenzophenone, 4-benzoyl-4'-methyldiphenyl sulfide, acrylated benzophenone, 3,3',4,4'-tetra(t-butylperoxycarbonyl)benzophenone, and 3,3'-dimethyl-4-methoxybenzophenone; thioxanthone compounds such as 2-isopropylthioxanthone, 2,4-dimethylthioxanthone, 2,4-diethylthioxanthone, and 2,4-dichlorothioxanthone; aminobenzophenone compounds such as Michler's ketone and 4,4'-diethylaminobenzophenone; 10-butyl-2-chloroacridone; 2-ethylanthraquinone; 9,10-phenanthrenequinone; camphorquinone; aromatic ketone compounds such as acetonaphthone and 1-hydroxycyclohexyl phenyl ketone; aromatic aldehydes such as terephthalaldehyde; quinone-based aromatic compounds such as methylanthraquinone; and the like. These hydrogen abstraction-type photoinitiators may be used either alone or in combination.

Examples of the photosensitizer include amines such as aliphatic amines and aromatic amines (e.g., 4-dimethylaminopyridine), ureas such as o-tolylthiourea, sulfur compounds such as sodium diethyl dithiophosphate and s-benzylisothiuronium p-toluenesulfonate, 4-dimethylaminopyridine, and the like.

The photoinitiator and the photosensitizer are normally used in an amount of 0.2 to 20 parts by mass based on 100 parts by mass of the rubber-based compound.

The rubber-based pressure-sensitive adhesive composition may include a UV absorber. A gas barrier film laminate that includes a pressure-sensitive adhesive layer that includes a specific UV absorber exhibits excellent UV cut capability, shows yellowing and haze to only a small extent, and exhibits excellent optical properties in addition to the above properties.

The UV absorber is preferably a benzotriazole-based UV absorber that includes a compound having a benzotriazole skeleton.

The benzotriazole-based UV absorber absorbs harmful UV rays included in sunlight, and converts the absorbed UV rays into harmless thermal energy in the molecule to prevent excitation of active species in the polymer that initiate photodegradation. A pressure-sensitive adhesive layer formed using the rubber-based pressure-sensitive adhesive composition that includes the rubber-based compound and the benzotriazole-based UV absorber exhibits a gas barrier capability, a UV cut capability, adhesion, and optical properties in a well-balanced manner.

Examples of the benzotriazole-based UV absorber include, but are not limited to, 1,2,3-benzotriazole, 1-[N,N-bis(2-ethylhexyl)aminomethyl]benzotriazole, carboxybenzotriazole, 2-[2-hydroxy-3,5-bis(α,α-dimethylbenzyl)phenyl]-2H-benzotriazole, 2-(2-hydroxy-4-octylphenyl)-2H-benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-3'-tert-amyl-5'-isobutylphenyl)-5-chlorobenzotriazole, 2-(2'-hydroxy-3'-isobutyl-5'-methylphenyl)-5-chlorobenzotriazole, 2-(2'-hydroxy-3'-isobutyl-5'-propylphenyl)-5-chlorobenzotriazole, 2-(2'-hydroxy-3',5'-di-tert-butylphenyl)benzotriazole, 2-(2'-hydroxy-5'-methylphenyl)benzotriazole, 2-[2'-hydroxy-5'-(1,1,3,3-tetramethyl)phenyl]benzotriazole, and the like. Among these, 1,2,3-benzotriazole is particularly preferable.

The benzotriazole-based UV absorber is preferably used in an amount of 0.01 to 30 parts by mass, more preferably 0.05 to 25 parts by mass, and particularly preferably 0.1 to 20 parts by mass, based on 100 parts by mass of the pressure-sensitive adhesive layer.

When the amount of the benzotriazole-based UV absorber added to the pressure-sensitive adhesive layer is 0.01 parts by mass or more, UV rays can be sufficiently blocked. When the amount of the benzotriazole-based UV absorber added to the pressure-sensitive adhesive layer is 30 parts by mass or less, precipitation, a decrease in adhesion, and the like rarely occur.

The rubber-based pressure-sensitive adhesive composition may include various other additives such as a light stabilizer, an antioxidant, a tackifier, a plasticizer, a coloring agent, a resin stabilizer, a filler, a pigment, an extender, an antistatic agent, and a silane coupling agent as long as the barrier capability, adhesion, and the like are not impaired. These additives may be used either alone or in combination.

The thickness of the pressure-sensitive adhesive layer is not particularly limited, and may be appropriately selected. The thickness of the pressure-sensitive adhesive layer is preferably 0.5 to 100 μm, more preferably 1 to 60 μm, and still more preferably 3 to 40 μm. When the thickness of the pressure-sensitive adhesive layer is 0.5 μm or more, excellent adhesion can be obtained. When the thickness of the pressure-sensitive adhesive layer is 100 μm or less, high productivity can be achieved.

The water vapor transmission rate of the pressure-sensitive adhesive layer at a temperature of 40° C. and a relative humidity of 90% is preferably 25 $g/m^2/day$ or less, more preferably 20 $g/m^2/day$ or less, and still more preferably 15 $g/m^2/day$ or less (when the thickness of the pressure-sensitive adhesive layer is 50 μm). When the water vapor transmission rate of the pressure-sensitive adhesive layer is 25 $g/m^2/day$, entrance of water from the end of the pressure-sensitive adhesive layer can be prevented, and lifting rarely occurs at the end of the pressure-sensitive adhesive layer. The water vapor transmission rate of the pressure-sensitive adhesive layer may be measured by a known method. Specifically, the water vapor transmission rate of the pressure-sensitive adhesive layer may be measured by the method described later in connection with the examples.

Gas Barrier Film Laminate

The gas barrier film laminate according to one embodiment of the invention has a configuration in which at least two gas barrier films are stacked through the pressure-sensitive adhesive layer formed using the rubber-based pressure-sensitive adhesive composition, and at least one of the at least two gas barrier films includes the base formed of the plastic film, and at least one gas barrier layer provided on the base.

The shape of the gas barrier film laminate according to one embodiment of the invention is not particularly limited. For example, the gas barrier film laminate may be in the shape of a sheet, a rectangular parallelepiped, a polygonal prism, a tube, or the like. It is preferable that the gas barrier film laminate have a shape suitable for an electronic member (described later).

The number of gas barrier films included (stacked) in the gas barrier film laminate according to one embodiment of the invention is not particularly limited as long as the number of gas barrier films is 2 or more. The number of gas barrier films included (stacked) in the gas barrier film laminate is normally 2 to 10.

The gas barrier films may be stacked through the pressure-sensitive adhesive layer using an arbitrary method. For example, a known method as described later may be employed.

The gas barrier film laminate according to one embodiment of the invention may optionally include an additional layer such as a protective layer, a conductive layer, or a primer layer. The additional layer may be situated at an arbitrary position. The additional layer may be a single layer, or may include a plurality of identical or different layers.

Protective Layer

The protective layer protects the gas barrier film laminate when an impact is applied to the gas barrier film laminate from the outside. It is preferable that the protective layer have high transparency and excellent scratch resistance. The protective layer may be situated at an arbitrary position. It is preferable that the protective layer be situated as the outermost layer of the gas barrier film laminate.

A material for forming the protective layer is not particularly limited. The protective layer may be formed using an arbitrary known material. Examples of the material for forming the protective layer include silicon-containing compounds; polymerizable compositions that include a photopolymerizable compound that includes a photopolymerizable monomer and/or a photopolymerizable prepolymer, and an initiator that generates radicals at least due to light in the visible region; resins such as a polyester resin, a polyurethane resin (particularly a two-component curable resin that includes an isocyanate compound and a polyacryl polyol, a polyester polyol, a polyether polyol, or the like), an acrylic resin, a polycarbonate resin, a vinyl chloride/vinyl acetate copolymer, a polyvinyl butyral resin, and a nitrocellulose resin; alkyl titanates; ethyleneimine; and the like. These materials may be used either alone or in combination.

The protective layer may be formed by dissolving or dispersing the above material in an appropriate solvent to prepare a protective layer-forming solution, applying the protective layer-forming solution to the target layer (i.e., a layer on which the protective layer to be formed) using a known method to form a film, drying the film, and optionally applying heat or UV rays to the dried film.

The protective layer-forming solution may be applied to the target layer using a normal wet coating method. Examples of the wet coating method include a dipping method, a roll coating method, a gravure coating method, a knife coating method, an air knife coating method, a roll knife coating method, a die coating method, a screen printing method, a spray coating method, a gravure offset method, and the like.

The film formed by applying the protective layer-forming solution may be dried by a known drying method such as hot-air drying, heat roll drying, or infrared irradiation. The thickness of the protective layer may be appropriately selected depending on the intended use of the gas barrier film laminate. The thickness of the protective layer is preferably 0.05 to 50 μm, more preferably 0.1 to 10 μm, and still more preferably 0.2 to 5 μm.

When the thickness of the protective layer is 0.05 μm or more, the protective layer exhibits sufficient scratch resistance. When the thickness of the protective layer is 50 μm or less, curling rarely occurs after forming the protective layer.

Conductive Layer

Examples of a material for forming the conductive layer include metals, alloys, metal oxides, electrically conductive compounds, mixtures thereof, and the like. Specific examples of the material for forming the conductive layer include antimony-doped tin oxide (ATO); fluorine-doped tin oxide (FTO); conductive metal oxides such as tin oxide, zinc oxide, indium oxide, indium tin oxide (ITO), and indium zinc oxide (IZO); metals such as gold, silver, chromium, and nickel; mixtures of these metals and conductive metal oxides; inorganic conductive materials such as copper iodide and copper sulfide; organic conductive materials such as polyaniline, polythiophene, and polypyrrole; and the like.

It is preferable to use a conductive metal oxide (particularly preferably ITO) as the material for forming the conductive layer from the viewpoint of transparency. The conductive layer may be a laminate that includes a plurality of layers formed of these materials.

The conductive layer may be formed by a deposition (evaporation) method, a sputtering method, an ion plating method, a thermal CVD method, a plasma CVD method, or the like. It is preferable to form the conductive layer using a sputtering method since the conductive layer can be easily formed.

When forming the conductive layer using a sputtering method, a discharge gas (e.g., argon) is introduced into a vacuum chamber. A high-frequency voltage or a direct-current voltage is applied between a target and a substrate to generate plasma, and the plasma is allowed to collide with the target so that the target material adheres to the substrate to obtain a thin film. The target is formed using the material for forming the conductive layer.

The thickness of the conductive layer may be appropriately selected depending on the application and the like. The thickness of the conductive layer is normally 10 nm to 50 μm, and preferably 20 nm to 20 μm. The surface resistivity of the conductive layer is normally 1000 Ω/square or less.

The conductive layer may optionally be patterned. The conductive layer may be patterned by chemical etching (e.g., photolithography), physical etching using a laser or the like, a vacuum deposition method using a mask, a sputtering method, a lift-off method, a printing method, or the like.

Primer Layer

The gas barrier film laminate according to one embodiment of the invention may include a primer layer between the base layer and the gas barrier layer, or between the base layer or the gas barrier layer and an additional layer.

The primer layer improves interfacial adhesion between two layers.

A material for forming the primer layer is not particularly limited. The primer layer may be formed using an arbitrary known material. Examples of the material for forming the primer layer include silicon-containing compounds; polymerizable compositions that include a photopolymerizable compound that includes a photopolymerizable monomer and/or a photopolymerizable prepolymer, and an initiator that generates radicals at least due to light in the visible region; resins such as a polyester resin, a polyurethane resin (particularly a two-component curable resin that includes an isocyanate compound and a polyacryl polyol, a polyester polyol, a polyether polyol, or the like), an acrylic resin, a polycarbonate resin, a vinyl chloride/vinyl acetate copolymer, a polyvinyl butyral resin, and a nitrocellulose resin; alkyl titanates; ethyleneimine; and the like.

These materials may be used either alone or in combination.

The primer layer may be formed by dissolving or dispersing the above material in an appropriate solvent to prepare a primer layer-forming solution, applying the primer layer-forming solution to one side or each side of the base layer to form a film, drying the film, and optionally heating the dried film.

The primer layer-forming solution may be applied using a normal wet coating method. Examples of the wet coating method include a dipping method, a roll coating method, a gravure coating method, a knife coating method, an air knife coating method, a roll knife coating method, a die coating method, a screen printing method, a spray coating method, a gravure offset method, and the like.

The film formed by applying the primer layer-forming solution may be dried using a known drying method such as hot-air drying, heat roll drying, or infrared irradiation. The thickness of the primer layer is normally 10 to 5000 nm, preferably 20 to 4000 nm, and more preferably 30 to 3000 nm.

The layer configuration of the gas barrier film laminate according to one embodiment of the invention is not particularly limited as long as at least two gas barrier films are stacked through the pressure-sensitive adhesive layer formed using the rubber-based pressure-sensitive adhesive composition.

FIG. 1 illustrates examples of the gas barrier film laminate according to one embodiment of the invention.

A gas barrier film laminate 100A illustrated in FIG. 1 (see (a)) has a configuration in which two gas barrier films are stacked through a pressure-sensitive adhesive layer so that the gas barrier films face each other through the pressure-sensitive adhesive layer (i.e., the gas barrier films are formed on either side of the pressure-sensitive adhesive layer). The gas barrier film laminate 100A has a layer configuration "base/gas barrier layer/pressure-sensitive adhesive layer/gas barrier layer/base".

A gas barrier film laminate 100B illustrated in FIG. 1 (see (b)) has a configuration in which two gas barrier films are stacked so that the gas barrier film and a base face each other through the pressure-sensitive adhesive layer (i.e., the gas barrier film and the base are formed on either side of the pressure-sensitive adhesive layer). The gas barrier film laminate 100B has a layer configuration "base/gas barrier layer/pressure-sensitive adhesive layer/base/gas barrier layer".

It is preferable that the gas barrier film laminate according to one embodiment of the invention have the layer configuration "base/gas barrier layer/pressure-sensitive adhesive layer/gas barrier layer/base" illustrated in FIG. 1 (see (a)), or include the layer configuration "base/gas barrier layer/pressure-sensitive adhesive layer/gas barrier layer/base", since scratches or pinhole are rarely formed in the gas barrier layer, and a deterioration in water vapor barrier capability rarely occurs.

The gas barrier film laminate 100A according to one embodiment of the invention that has the layer configuration "base/gas barrier layer/pressure-sensitive adhesive layer/gas barrier layer/base" illustrated in FIG. 1 (see (a)) may be produced as described below, for example.

Figure 2:
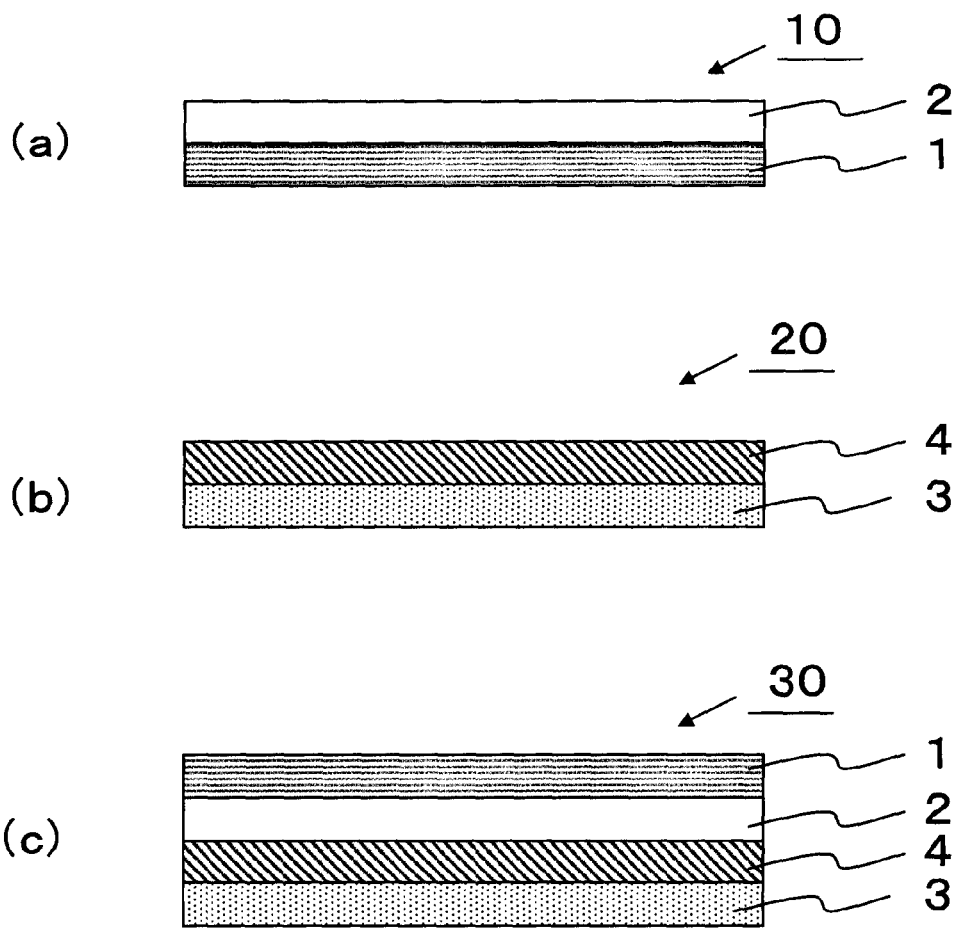
FIG. 2 is a cross-sectional view illustrating the production steps of a gas barrier film laminate according to one embodiment of the invention.

As illustrated in FIG. 2, a gas barrier film 10 is provided that includes a base 1 formed of a plastic film, and a gas barrier layer 2 provided on the base 1 (see (a)). Note that two gas barrier films 10 are provided.

A pressure-sensitive adhesive layer 4 is formed on a release film 3 to obtain a release film 20 provided with the pressure-sensitive adhesive layer (see (b) in FIG. 2).

The pressure-sensitive adhesive layer may be formed by an arbitrary method. The pressure-sensitive adhesive layer may be formed by a known method. For example, a rubber-based pressure-sensitive adhesive composition that includes a rubber-based compound is dissolved in an appropriate organic solvent (e.g., toluene, ethyl acetate, or methyl ethyl ketone) to prepare a pressure-sensitive adhesive layer-forming composition. The pressure-sensitive adhesive layer-forming composition is applied to the release film 3 using a known coating method (e.g., spin coating method, spray coating method, bar coating method, knife coating method, roll coating method, blade coating method, die coating method, or gravure coating method) to form a film, and the solvent is removed from the film by drying, followed by optional heating to form the pressure-sensitive adhesive layer 4. The concentration of the pressure-sensitive adhesive layer-forming composition (solution) is 10 to 60 mass %, and preferably 10 to 30 mass %.

The release film is not particularly limited. Examples of the release film include a film obtained by applying a release agent such as a silicone resin to a plastic film such as a polyester film (e.g., polyethylene terephthalate, polybutylene terephthalate, or polyethylene naphthalate) or a polyolefin film (e.g., polypropylene or polyethylene) to form a release layer, and the like. The thickness of the release film is not particularly limited. The thickness of the release film is normally about 20 to about 150 μm.

The gas barrier layer 2 of the gas barrier film 10 is then bonded to the pressure-sensitive adhesive layer 4 of the release film 20 provided with the pressure-sensitive adhesive layer to obtain a laminate 30 (see (c) in FIG. 2). The gas barrier layer 2 may be bonded to the pressure-sensitive adhesive layer 4 using an arbitrary method. For example, the gas barrier layer 2 may be bonded to the pressure-sensitive adhesive layer 4 using a known laminator.

Figure 3:
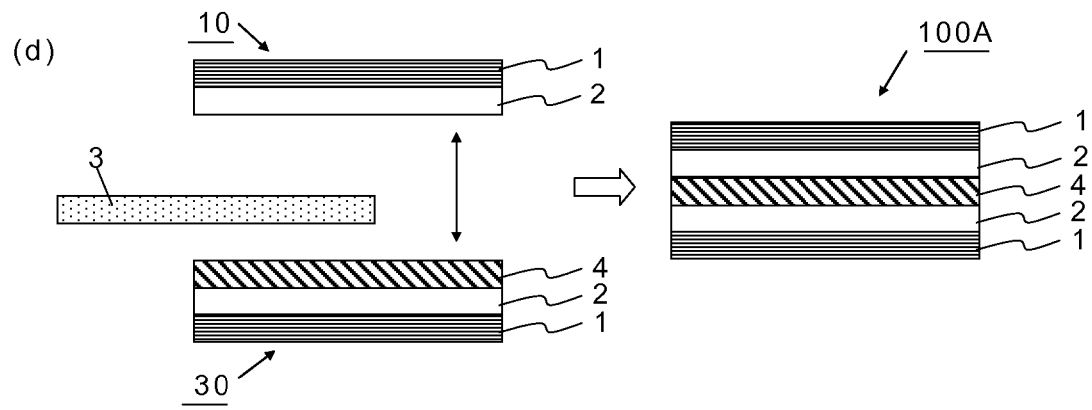
FIG. 3 is a cross-sectional view illustrating the production steps of a gas barrier film laminate according to one embodiment of the invention.

The release film 3 of the laminate 30 is then removed, and the gas barrier layer 2 of the other gas barrier film 10 is bonded to the exposed pressure-sensitive adhesive layer 4 to obtain a gas barrier film laminate 100A (see (d) in FIG. 3).

The gas barrier film laminate according to one embodiment of the invention may be formed by a method other than the above method. For example, a pressure-sensitive adhesive layer may be formed directly on the gas barrier layer 2 of the gas barrier film 10 illustrated in FIG. 2 (see (a)), and bonded to the other gas barrier film under pressure to obtain a gas barrier film laminate.

The gas barrier film laminate according to one embodiment of the invention exhibits a high water vapor barrier capability, and does not show interfacial lifting at the end thereof.

The water vapor transmission rate of the gas barrier film laminate according to one embodiment of the invention at a temperature of 40° C. and a relative humidity of 90% is preferably 0.001 g/m$^2$/day or less, more preferably 0.0005 g/m$^2$/day or less, and still more preferably 0.0001 g/m$^2$/day or less.

The gas barrier film laminate according to one embodiment of the invention preferably shows no or only slight lifting at the end thereof even when the gas barrier film laminate is subjected to high-temperature/high-humidity conditions (temperature: 60° C., relative humidity: 90%) for 150 hours, and then conditioned at a temperature of 23° C. and a relative humidity of 50% for 1 day.

The gas barrier film laminate according to one embodiment of the invention preferably exhibits excellent transparency. The visible light transmittance of the gas barrier film laminate according to one embodiment of the invention at a wavelength of 500 nm is preferably 80% or more, more preferably 85% or more, and particularly preferably 89% or more.

The gas barrier film laminate according to one embodiment of the invention exhibits an excellent UV cut capability and optical properties in addition to the above properties when at least one of the gas barrier films includes a base formed of a transparent plastic film, and at least one gas barrier layer provided on the base, and the pressure-sensitive adhesive layer is a layer formed using a rubber-based pressure-sensitive adhesive composition that includes a rubber-based compound and a benzotriazole-based UV absorber (hereinafter may be referred to as "gas barrier film laminate (2)").

The UV cut ratio of the gas barrier film laminate (2) according to one embodiment of the invention at a wavelength of 350 nm is preferably 94% or more, more preferably 95% or more, and still more preferably 97% or more.

The yellowness index (Y1) of the gas barrier film laminate (2) according to one embodiment of the invention is preferably 4 or less, and more preferably 3.5 or less.

The haze of the gas barrier film laminate (2) according to one embodiment of the invention is preferably 2 or less, and more preferably 1.8 or less.

The gas barrier film laminate according to one embodiment of the invention exhibits excellent durability. In particular, the gas barrier film laminate (2) according to one embodiment of the invention shows only a small change in optical properties even when the gas barrier film laminate (2) is subjected to high-temperature/high-humidity conditions for a long time.

The gas barrier film laminate (2) according to one embodiment of the invention preferably shows a change in visible light transmittance of 0.1% or less, a change in yellowness index (Y1) of 0.2 or less, and a change in haze of 0.3 or less when the gas barrier film laminate (2) is allowed to stand at a temperature of 60° C. and a relative humidity of 90% for 150 hours.

The gas barrier film laminate according to the embodiments of the invention is useful as a gas barrier film for an electronic member according to one embodiment of the invention (see below).

2) Electronic Member

An electronic member according to one embodiment of the invention includes the gas barrier film laminate according to one embodiment of the invention.

Examples of the electronic member include flexible substrates such as a liquid crystal display member, an organic EL display member, an inorganic EL display member, an electronic paper member, a solar cell member, and a thermoelectric conversion member.

EXAMPLES

The invention is further described below by way of examples. Note that the invention is not limited to the following examples.

Production Example 1: Production of Gas Barrier Film

A polysilazane compound (coating material including perhydropolysilazane as the main component ("Aquamika NL110-20" manufactured by Clariant Japan K.K.)) was spin-coated onto a polyethylene terephthalate film ("PET38 T-100" manufactured by Mitsubishi Plastics Inc., thickness: 38 μm (hereinafter referred to as "PET film")) (base), and heated at 120° C. for 1 minute to form a perhydropolysilazane-containing layer (polysilazane layer) having a thickness of 150 nm on the PET film.

Argon (Ar) ions were implanted into the surface of the polysilazane layer under the following conditions using a plasma ion implantation apparatus to form a gas barrier layer to obtain a gas barrier film.

The details of the plasma ion implantation apparatus and the ion implantation conditions used to form the gas barrier layer are shown below.

Plasma Ion Implantation Apparatus
RF power supply: "RF56000" manufactured by JEOL Ltd.
High-voltage pulse power supply: "PV-3-HSHV-0835" manufactured by Kurita Seisakusho Co., Ltd.
Plasma Ion Implantation Conditions
Plasma-generating gas: Ar
Gas flow rate: 100 sccm
Duty ratio: 0.5%
Applied voltage: −6 kV
RF power supply: frequency: 13.56 MHz, applied electric power: 1000 W
Chamber internal pressure: 0.2 Pa
Pulse width: 5 μsec
Ion implantation time: 200 seconds Production Example 2: Production of Pressure-Sensitive Adhesive Composition A 100 parts by mass of a polyisobutylene-based resin ("Opanol B50" manufactured by BASF, Mw: 340,000) (rubber-based compound), 30 parts by mass of a polybutene resin ("Nisseki Polybutene Grade HV-1900" manufactured by Nippon Oil Corporation, Mw: 1900) (rubber-based compound), and 50 parts by mass of a cycloolefin-based polymer ("Eastotac H-100L Resin" manufactured by of Eastman Chemical Company) were dissolved in toluene to obtain a rubber-based pressure-sensitive adhesive composition A having a solid content of about 18 mass %.

Production Example 3: Production of Pressure-Sensitive Adhesive Composition B

A resin composition ("TN-560" manufactured by MORESCO) including a rubber-based compound was dissolved in toluene to obtain a rubber-based pressure-sensitive adhesive composition B having a solid content of about 20 mass %.

Production Example 4: Production of Pressure-Sensitive Adhesive Composition C

A resin composition ("TY-070" manufactured by MORESCO) including a rubber-based compound was dissolved in toluene to obtain a rubber-based pressure-sensitive adhesive composition C having a solid content of about 30 mass %.

Production Example 5: Production of Pressure-Sensitive Adhesive Composition D 100 parts by mass of a polyisobutylene-based resin ("Opanol B50" manufactured by BASF, Mw: 340,000) (rubber-based compound), 1.5 parts by mass of a hydrogen abstraction-type photoinitiator ("Irgacure 500" manufactured by BASF Japan Ltd.), and 1.5 parts by mass of a photosensitizer (4-dimethylaminopyridine) were dissolved in toluene to obtain a rubber-based pressure-sensitive adhesive composition D having a solid content of about 16.7 mass %.

Production Example 6: Production of Pressure-Sensitive Adhesive Composition E 100 parts by mass of a resin composition ("TN-560" manufactured by MORESCO) including a rubber-based compound, 1.5 parts by mass of a hydrogen abstraction-type photoinitiator ("Irgacure 500" manufactured by BASF Japan Ltd.), and 1.5 parts by mass of a photosensitizer (4-dimethylaminopyridine) were dissolved in toluene to obtain a rubber-based pressure-sensitive adhesive composition E having a solid content of about 18 mass %.

Production Examples 7 to 11: Production of Rubber-Based Pressure-Sensitive Adhesive Compositions F to J 100 parts by mass of a polyisobutylene-based resin ("Opanol B50" manufactured by BASF, Mw: 340,000) (rubber-based compound), 30 parts by mass of a polybutene resin ("Nisseki Polybutene Grade HV-1900" manufactured by Nippon Oil Corporation, Mw: 1900) (rubber-based compound), 50 parts by mass of a cycloolefin-based polymer ("Eastotac H-100L Resin" manufactured by of Eastman Chemical Company), and a UV absorber (see Table 1 as to the type and the amount (mass %) of the UV absorber) were dissolved in toluene to obtain a rubber-based pressure-sensitive adhesive composition (F to J) having a solid content of about 18 mass %.

The following UV absorbers were used to produce the rubber-based pressure-sensitive adhesive compositions F to J.
A: benzotriazole-based UV absorber ("Tinuvin 109" manufactured by BASF Japan Ltd.)
B: benzophenone-based UV absorber ("Cyasorb UV-24" manufactured by Cytec Industries Inc.)
C: hydroxyphenyltriazine-based UV absorber ("Tinuvin 477" manufactured by BASF Japan Ltd.)

TABLE 1

| | Pressure-sensitive adhesive layer | | |
| --- | --- | --- | --- |
| | Pressure sensitive adhesive composition | UV absorber | Amount (mass %) |
| Production Example 7 | F | A | 3 |
| Production Example 8 | G | A | 6 |
| Production Example 9 | H | A | 9 |
| Production Example 10 | I | B | 6 |
| Production Example 11 | J | C | 6 |

Example 1

The rubber-based pressure-sensitive adhesive composition A was applied to the surface of a release layer of a release film in which a silicone release layer was provided on one side of a polyethylene terephthalate film having a thickness of 38 μm ("SP-PET381031" manufactured by Lintec Corporation) using a comma direct coating method, and dried at 100° C. for 1 minute to form a pressure-sensitive adhesive layer having a thickness of about 10 μm to obtain a release film A provided with the pressure-sensitive adhesive layer.

The gas barrier layer of the gas barrier film was bonded to the pressure-sensitive adhesive layer of the release film A provided with the pressure-sensitive adhesive layer, and the release film was removed.

The exposed pressure-sensitive adhesive layer was bonded to the gas barrier layer of another gas barrier film to produce a gas barrier film laminate A.

Example 2

A gas barrier film laminate B was produced in the same manner as in Example 1, except that a release film B provided with a pressure-sensitive adhesive layer that was prepared using the rubber-based pressure-sensitive adhesive composition B instead of the rubber-based pressure-sensitive adhesive composition A, was used.

Example 3

A gas barrier film laminate C was produced in the same manner as in Example 1, except that a release film C provided with a pressure-sensitive adhesive layer that was prepared using the rubber-based pressure-sensitive adhesive composition C instead of the rubber-based pressure-sensitive adhesive composition A, was used.

Example 4

A release film D provided with a pressure-sensitive adhesive layer was prepared in the same manner as in Example 1, except that a film was formed on the release film using the rubber-based pressure-sensitive adhesive composition D instead of the rubber-based pressure-sensitive adhesive composition A, and the release film was irradiated with UV rays at a dose of 1000 mJ/cm$^2$ to form a pressure-sensitive adhesive layer. A gas barrier film laminate D was produced in the same manner as in Example 1, except that the release film D provided with the pressure-sensitive adhesive layer was used.

Example 5

A release film E provided with a pressure-sensitive adhesive layer was prepared in the same manner as in Example 1, except that a film was formed on the release film using the rubber-based pressure-sensitive adhesive composition E instead of the rubber-based pressure-sensitive adhesive composition A, and the release film was irradiated with UV rays at a dose of 1000 mJ/cm$^2$ to form a pressure-sensitive adhesive layer. A gas barrier film laminate E was produced in the same manner as in Example 1, except that the release film E provided with the pressure-sensitive adhesive layer was used.

Example 6

A gas barrier film laminate F was produced in the same manner as in Example 1, except that a release film F provided with a pressure-sensitive adhesive layer that was prepared using the rubber-based pressure-sensitive adhesive composition F instead of the rubber-based pressure-sensitive adhesive composition A, was used.

Example 7

A gas barrier film laminate G was produced in the same manner as in Example 1, except that a release film G provided with a pressure-sensitive adhesive layer that was prepared using the rubber-based pressure-sensitive adhesive composition G instead of the rubber-based pressure-sensitive adhesive composition A, was used.

Example 8

A gas barrier film laminate H was produced in the same manner as in Example 1, except that a release film H provided with a pressure-sensitive adhesive layer that was prepared using the rubber-based pressure-sensitive adhesive composition H instead of the rubber-based pressure-sensitive adhesive composition A, was used.

Example 9

A gas barrier film laminate I was produced in the same manner as in Example 1, except that a release film I provided with a pressure-sensitive adhesive layer that was prepared using the rubber-based pressure-sensitive adhesive composition I instead of the rubber-based pressure-sensitive adhesive composition A, was used.

Example 10

A gas barrier film laminate J was produced in the same manner as in Example 1, except that a release film J provided with a pressure-sensitive adhesive layer that was prepared using the rubber-based pressure-sensitive adhesive composition J instead of the rubber-based pressure-sensitive adhesive composition A, was used.

Comparative Example 1

Two gas barrier films were prepared as described above. The gas barrier layer of one of the gas barrier films was bonded to a pressure-sensitive adhesive layer of a pressure-sensitive adhesive sheet in which a urethane pressure-sensitive adhesive layer was provided on a release film ("G-6" manufactured by Kurabo Industries, Ltd., thickness: 25 μm) using a heat laminator (lamination roll temperature: 110° C. (measured value), speed: 0.2 m/min (measured value)). After removing the release film, the exposed urethane pressure-sensitive adhesive layer was bonded to the gas barrier layer of the other gas barrier film using the heat laminator to produce a gas barrier film laminate K.

The gas barrier film laminates obtained in Examples 1 to 10 and Comparative Example 1 were subjected to the following measurements to evaluate the performance of each gas barrier film laminate. The measurement results are shown in Tables 2 and 3. In Tables 2 and 3, "60° C. 90%" indicates that the temperature was 60° C. and the relative humidity was 90%.

Measurement of Water Vapor Transmission Rate of Gas Barrier Film Laminate

The water vapor transmission rate of each gas barrier film laminate was measured at a temperature of 40° C. and a relative humidity of 90%.

The water vapor transmission rate was measured using a water vapor transmission rate measurement apparatus "L89-500" (manufactured by LYSSY) (when the water vapor transmission rate was 0.01 g/m$^2$/day or more) or "delta-perm" (manufactured by TECHNOLOX) (when the water vapor transmission rate was less than 0.01 g/m$^2$/day).

Measurement of Water Vapor Transmission Rate of Pressure-Sensitive Adhesive Layer Each of the pressure-sensitive adhesive compositions A to J was applied to a polyethylene terephthalate film ("K200-6E" manufactured by Mitsubishi Plastics, Inc., thickness: 6 μm, hereinafter referred to as "PET6E film") using a comma direct coating method. The resulting film was dried at 110° C. for 1 minute to form a pressure-sensitive adhesive layer having a thickness of about 50 μm to obtain a water vapor transmission rate measurement sample.

Each pressure-sensitive adhesive layer was bonded to a PET6E film to prepare a laminate having a layer configuration "PET6E/pressure-sensitive adhesive layer (50 μm)/PET6E" to obtain water vapor transmission rate measurement samples corresponding to Examples 1 to 10.

Two pressure-sensitive adhesive sheets in which a urethane pressure-sensitive adhesive layer was provided on a release film ("G-6" manufactured by Kurabo Industries, Ltd., thickness: 25 μm) were provided. The pressure-sensitive adhesive layers of the pressure-sensitive adhesive sheets were bonded using a heat laminator (lamination roll temperature: 110° C. (measured value), speed: 0.2 m/min (measured value)).

After removing the release film, the exposed pressure-sensitive adhesive layer was bonded to a PET6E film using the heat laminator. After removing the other release film, the exposed urethane pressure-sensitive adhesive layer was bonded to another PET6E film using the heat laminator to prepare a laminate having a layer configuration "PET6E/urethane pressure-sensitive adhesive layer (50 μm)/PET6E" to obtain a water vapor transmission rate measurement sample corresponding to Comparative Example 1.

The water vapor transmission rate of the water vapor transmission rate measurement sample (pressure-sensitive adhesive layer) was measured in the same manner as the water vapor transmission rate of the gas barrier film laminate.

Presence or Absence of Lifting after Subjecting Gas Barrier Film Laminate to High-Temperature/High-Humidity Conditions The gas barrier film laminates obtained in Examples 1 to 10 and Comparative Example 1 were cut to dimensions of 120×120 mm, and subjected to high-temperature/high-humidity conditions (temperature: 60° C., relative humidity: 90%) for 150 hours. The gas barrier film laminates were then conditioned at a temperature of 23° C. and a relative humidity of 50% for 1 day, and the presence or absence of lifting at the end of each laminate was observed with the naked eye.

The presence or absence of lifting was evaluated in accordance with the following criteria.
Very good: No lifting was observed at the end of the laminate with the naked eye.
Good: Almost no lifting was observed at the end of the laminate with the naked eye.
Poor: Lifting was observed at the end of the laminate with the naked eye.

Measurement of Adhesion Between Pressure-Sensitive Adhesive Layer and Gas Barrier Layer Each of the pressure-sensitive adhesive compositions A to C and F to J was applied to a polyethylene terephthalate film ("PET50A-4100" manufactured by Toyobo Co., Ltd., thickness: 50 μm, hereinafter referred to as "PET50A film") using a comma direct coating method. The resulting film was dried at 100° C. for 1 minute to form a pressure-sensitive adhesive layer having a thickness of about 10 μm to obtain adhesion measurement samples corresponding to Examples 1 to 3 and 6 to 10.

Each of the pressure-sensitive adhesive compositions D and E was applied to a PET50A film using a comma direct coating method. The resulting film was dried at 100° C. for 1 minute to form a pressure-sensitive adhesive layer having a thickness of about 10 μm.

The release film was then irradiated with UV rays at a dose of 1000 mJ/cm$^2$ to obtain adhesion measurement samples corresponding to Examples 4 and 5.

The pressure-sensitive adhesive layer of the adhesion measurement sample was bonded to the gas barrier layer of the gas barrier film to prepare a laminate having a layer configuration "gas barrier film (base/gas barrier layer)/adhesion measurement sample (pressure-sensitive adhesive layer/PET50A)".

A pressure-sensitive adhesive layer of a pressure-sensitive adhesive sheet in which a urethane pressure-sensitive adhesive layer was provided on a release film ("G-6" manufactured by Kurabo Industries, Ltd., thickness: 25 μm) was bonded to a PET50A film using a heat laminator (lamination roll temperature: 110° C. (measured value), speed: 0.2 m/min (measured value)) to obtain an adhesion measurement sample corresponding to Comparative Example 1.

After removing the release film, the exposed urethane pressure-sensitive adhesive layer was bonded to the gas barrier layer of the gas barrier film using the heat laminator to prepare a laminate having a layer configuration "gas barrier film (base/gas barrier layer)/adhesion measurement sample (urethane pressure-sensitive adhesive layer/PET50A)".

The peeling adhesive strength (180°) (N/25 mm) of each laminate was measured at a temperature of 23° C. and a relative humidity of 50% in accordance with JIS Z 0237 (revised edition published in 2000) (adhesion measurement method) when 24 hours had elapsed after preparation of the laminate.

Measurement of UV Cut Ratio

The UV cut ratio (%) of the gas barrier film laminates A and F to J at a wavelength of 350 nm was measured. The UV cut ratio was measured using a UV-VIS spectrophotometer ("UV-3600" manufactured by Shimadzu Corporation).

Evaluation of Optical Properties

The visible light transmittance, the yellowness index, and the haze of the gas barrier film laminates A and F to J were measured before and after the gas barrier film laminate was subjected to high-temperature/high-humidity conditions (temperature: 60° C., relative humidity: 90%) for 150 hours.

The visible light transmittance, the yellowness index, and the haze were measured by the following methods.

(1) Visible Light Transmittance

The visible light transmittance (%) (wavelength: 500 nm) was measured in accordance with JIS K 7631-1 using a haze meter ("HAZE METER NDH5000" manufactured by Nippon Denshoku Industries Co., Ltd.).

(2) Yellowness Index (YI)

The yellowness index (YI) was measured in accordance with JIS K 7105 using a spectro color meter ("Spectro Color Meter SQ2000" manufactured by Nippon Denshoku Industries Co., Ltd.).

(3) Haze

The haze was measured in accordance with JIS K 7136 using a haze meter ("HAZE METER NDH5000" manufactured by Nippon Denshoku Industries Co., Ltd.).

TABLE 2

| | Pressure-sensitive adhesive layer | | | | Presence or absence of lifting |
|---|---|---|---|---|---|
| | Pressure-sensitive adhesive composition | Water vapor transmission rate of pressure-sensitive adhesive layer (g/m$^2$/day) | Water vapor transmission rate of gas barrier film laminate (g/m$^2$/day) | Adhesion between pressure-sensitive adhesive layer and gas barrier layer (N/25 mm) | after subjecting gas barrier film laminate to high-temperature/high-humidity conditions (60° C. 90%, 150 hr) |
| Example 1 | A | 5.0 | 0.0006 | 4.0 | Very good |
| Example 2 | B | 20.0 | 0.006 | 3.8 | Good |
| Example 3 | C | 10.0 | 0.005 | 10.5 | Good |
| Example 4 | D | 3.0 | 0.00025 | 3.5 | Very good |
| Example 5 | E | 20.0 | 0.008 | 5.2 | Good |
| Example 6 | F | 5.0 | 0.00065 | 4.0 | Very good |
| Example 7 | G | 5.0 | 0.00060 | 4.0 | Very good |
| Example 8 | H | 5.0 | 0.00063 | 4.0 | Very good |
| Example 9 | I | 5.0 | 0.00070 | 4.0 | Very good |
| Example 10 | J | 5.0 | 0.00065 | 4.0 | Very good |
| Comparative Example 1 | Urethane pressure-sensitive adhesive | 35.0 | 0.04 | 30.8 | Poor |

TABLE 3

| | Gas barrier film laminate | UV cut ratio (%) | Before subjecting gas barrier film laminate to high-temperature/high-humidity conditions | | | After subjecting gas barrier film laminate to high-temperature/high-humidity conditions (60° C. 90%, 150 hr) | | |
|---|---|---|---|---|---|---|---|---|
| | | | Visible light transmittance (%) | Yellowness index (YI) | Haze | Visible light transmittance (%) | Yellowness index (YI) | Haze |
| Example 1 | A | 12.0 | 90.8 | 3.45 | 1.72 | 90.8 | 3.50 | 1.77 |
| Example 6 | F | 97.9 | 90.8 | 3.36 | 1.70 | 90.7 | 3.48 | 1.84 |
| Example 7 | G | 99.9 | 90.6 | 3.32 | 1.63 | 90.6 | 3.41 | 1.87 |
| Example 8 | H | 99.9 | 90.6 | 3.25 | 1.75 | 90.6 | 3.30 | 1.97 |
| Example 9 | I | 99.9 | 90.1 | 15.99 | 7.96 | 89.9 | 16.79 | 8.46 |
| Example 10 | J | 98.8 | 89.0 | 22.98 | 8.76 | 89.0 | 25.57 | 10.62 |

As shown in Table 2, the gas barrier film laminates of Examples 1 to 10 that were obtained by bonding the gas barrier films through the pressure-sensitive adhesive layer formed of the rubber-based pressure-sensitive adhesive composition exhibited an excellent water vapor barrier capability and adhesion, and showed almost no lifting at the end thereof at the interface between the pressure-sensitive adhesive layer and the gas barrier film even when the gas barrier film laminates were subjected to the high-temperature/high-humidity conditions.

The gas barrier film laminate of Comparative Example 1 that was obtained by bonding the gas barrier films through the pressure-sensitive adhesive layer formed of the urethane-based pressure-sensitive adhesive exhibited a poor water vapor barrier capability and adhesion as compared with the gas barrier film laminates of Examples 1 to 10, and showed lifting at the end thereof at the interface between the pressure-sensitive adhesive layer and the gas barrier film.

As shown in Table 3, the gas barrier film laminates F to H of Examples 6 to 8 including the benzotriazole-based UV absorber exhibited a high UV cut capability, and had excellent optical properties before and after the gas barrier film laminates were subjected to the high-temperature/high-humidity conditions.

REFERENCE SIGNS LIST

1 Base formed of plastic
2 Gas barrier layer
3 Release film
4 Pressure-sensitive adhesive layer
10 Gas barrier film
20 Release film provided with pressure-sensitive adhesive layer
30 Laminate
100A, 100B Gas barrier film laminate

The invention claimed is:

1. A gas barrier film laminate comprising at least two gas barrier films and a pressure-sensitive adhesive layer,
   wherein the at least two gas barrier films are formed on the same side or opposing sides of the pressure-sensitive adhesive layer,
   at least one of the at least two gas barrier films includes a base formed of a plastic film, and at least one gas barrier layer provided on the base,
   the pressure-sensitive adhesive layer being a layer formed using a rubber-based pressure-sensitive adhesive composition that includes (i) a polyisobutylene-based resin as a rubber-based compound and (ii) a benzotriazole-based UV absorber,
   a material for forming the base formed of the plastic film is a polymer selected from the group consisting of polyimides, polyamides, polyamide-imides, polyphenylene ether, polyether ketone, polyether ether ketone, polyesters, polycarbonates, polysulfones, polyether sulfones, polyphenylene sulfides, polyallylates, acrylic resins, cycloolefin polymers, aromatic polymers, and combinations thereof,
   the at least one gas barrier layer provided on the base is a polymer layer that includes a part modified by ion implantation, wherein the polymer layer comprises silicon-based polymer compounds,
   the water vapor transmission rate of the pressure-sensitive adhesive layer at a temperature of 40° C. and a relative humidity of 90% is 25 g/m$^2$/day or less, when the thickness of the pressure-sensitive adhesive layer is 50 μm,
   the water vapor transmission rate of the gas barrier film laminate at a temperature of 40° C. and a relative humidity of 90% is 0.001 g/m$^2$/day or less,
   the visible light transmittance of the gas barrier film laminate at a wavelength of 500 nm is 80% or more,
   the UV cut ratio of the gas barrier film laminate at a wavelength of 350 nm is 94% or more, and
   the yellowness index (Y1) of the gas barrier film laminate is 4 or less.

2. The gas barrier film laminate according to claim 1, wherein at least one gas barrier layer is formed on one side of the pressure-sensitive adhesive layer and another gas barrier layer is formed on the other side of the pressure-sensitive adhesive layer.

3. The gas barrier film laminate according to claim 1, wherein the benzotriazole-based UV absorber is a compound selected from the group consisting of 1,2,3-benzotriazole, 1-[N,N-bis(2-ethylhexyl)aminomethyl]benzotriazole, carboxybenzotriazole, 2-[2-hydroxy-3,5-bis(α,α-dimethylbenzyl)phenyl]-2H-benzotriazole, 2-(2-hydroxy-4-octylphenyl)-2H-benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-3'-tert-amyl-5'-isobutylphenyl)-5-chlorobenzotriazole, 2-(2'-hydroxy-3'-isobutyl-5'-methylphenyl)-5-chlorobenzotriazole, 2-(2'-hydroxy-3'-isobutyl-5'-propylphenyl)-5-chlorobenzotriazole, 2-(2'-hydroxy-3',5'-di-tert-butylphenyl)benzotriazole, 2-(2'-hydroxy-5'-methylphenyl)benzotriazole, and 2-[2'-hydroxy-5'-(1,1,3,3-tetramethyl)phenyl]benzotriazole.

4. The gas barrier film laminate according to claim 1, wherein an amount of the benzotriazole-based UV absorber is 6 to 30 parts by mass based on 100 parts by mass of the pressure-sensitive adhesive layer.

5. The gas barrier film laminate according to claim 1, further comprising a polybutene resin.

6. The gas barrier film laminate according to claim 1, wherein a weight average molecular weight of the rubber-based compound is 10,000 to 3,000,000.

7. The gas barrier film laminate according to claim 1, further comprising a cyclic olefin-based polymer.

8. The gas barrier film laminate according to claim 7, wherein an amount of the cyclic olefin-based polymer in the rubber-based pressure-sensitive adhesive composition is 5 to 50 mass % on a solid basis.

9. The gas barrier film laminate according to claim 1, wherein the water vapor transmission rate of the pressure-sensitive adhesive layer at a temperature of 40° C. and a relative humidity of 90% is 15 g/m$^2$/day or less, when the thickness of the pressure-sensitive adhesive layer is 50 μm.

10. The gas barrier film laminate according to claim 1, wherein the visible light transmittance of the gas barrier film laminate at a wavelength of 500 nm is 89% or more.

11. The gas barrier film laminate according to claim 1, wherein the UV cut ratio of the gas barrier film laminate at a wavelength of 350 nm is 97% or more.

12. The gas barrier film laminate according to claim 1, wherein the yellowness index (Y1) of the gas barrier film laminate is 3.5 or less.

13. The gas barrier film laminate according to claim 1, wherein a change in visible light transmittance of 0.1% or less, a change in yellowness index (Y1) of 0.2 or less, and a change in haze of 0.3 or less when the gas barrier film laminate is allowed to stand at a temperature of 60° C. and a relative humidity of 90% for 150 hours.

14. The gas barrier film laminate according to claim 1, wherein the material for forming the base formed of the plastic film is polyamides or cycloolefin polymers.

15. The gas barrier film laminate according to claim 1, wherein a thickness of the base is 5 to 200 μm.

16. The gas barrier film laminate according to claim 1, wherein a thickness of the at least one gas barrier layer provided on the base is 40 to 500 nm.

17. The gas barrier film laminate according to claim 1, wherein at least one of the silicon-based polymer compounds is a polysilazane-based compound.

* * * * *